(12) United States Patent
Griffith, Sr. et al.

(10) Patent No.: US 9,187,189 B2
(45) Date of Patent: Nov. 17, 2015

(54) SYSTEM, APPARATUS, AND METHOD FOR ACTIVE DEBRIS REMOVAL

(71) Applicants: The Aerospace Corporation, El Segundo, CA (US); National Aeronautics and Space Administration, Houston, TX (US)

(72) Inventors: Anthony D. Griffith, Sr., Houston, TX (US); Rajiv Kohli, Houston, TX (US); Susan H. Burns, Sugar Land, TX (US); Stephen J. Damico, League City, TX (US); David J. Gruber, Friendswood, TX (US); Christsopher J. Hickey, Houston, TX (US); David E. Lee, Houston, TX (US); Travis M. Robinson, Friendswood, TX (US); Jason T. Smith, Friendswood, TX (US); Peter T. Spehar, Seabrook, TX (US); David S. Adlis, Seabrook, TX (US); Brian M. Kent, Dayton, OH (US)

(73) Assignees: The Aerospace Corporation, El Segundo, CA (US); National Aeronautics and Space Administration, Houston, TX (US)

( * ) Notice: Subject to any disclaimer, the term of this patent is extended or adjusted under 35 U.S.C. 154(b) by 176 days.

(21) Appl. No.: 13/650,738

(22) Filed: Oct. 12, 2012

(65) Prior Publication Data
US 2014/0107865 A1    Apr. 17, 2014

(51) Int. Cl.
| | | |
|---|---|---|
| *B64G 1/36* | (2006.01) | |
| *G05D 3/00* | (2006.01) | |
| *B64G 1/22* | (2006.01) | |
| *B64G 1/10* | (2006.01) | |
| *B64G 1/62* | (2006.01) | |
| *G05D 1/00* | (2006.01) | |
| *G06F 17/00* | (2006.01) | |
| *G05D 1/08* | (2006.01) | |
| *G05D 1/10* | (2006.01) | |

(52) U.S. Cl.
CPC .. *B64G 1/10* (2013.01); *B64G 1/62* (2013.01); *G05D 1/00* (2013.01); *G05D 1/0005* (2013.01); *G05D 1/0094* (2013.01); *G05D 1/0883* (2013.01); *G05D 1/10* (2013.01); *G06F 17/00* (2013.01)

(58) Field of Classification Search
USPC .......................... 701/2, 13; 244/158.6, 172.6
See application file for complete search history.

(56) References Cited

U.S. PATENT DOCUMENTS

| | | | | |
|---|---|---|---|---|
| 5,421,540 | A * | 6/1995 | Ting | 244/158.1 |
| 6,017,000 | A * | 1/2000 | Scott | 244/158.6 |
| 6,108,594 | A * | 8/2000 | Didinsky et al. | 701/13 |
| 6,655,637 | B1 * | 12/2003 | Robinson | 244/172.4 |
| 6,942,186 | B1 * | 9/2005 | Levin et al. | 244/158.2 |

(Continued)

*Primary Examiner* — Thomas G Black
*Assistant Examiner* — Tyler Paige
(74) *Attorney, Agent, or Firm* — LeonardPatel PC

(57) ABSTRACT

Systems, apparatuses, and methods for removal of orbital debris are provided. In one embodiment, an apparatus includes a spacecraft control unit configured to guide and navigate the apparatus to a target. The apparatus also includes a dynamic object characterization unit configured to characterize movement, and a capture feature, of the target. The apparatus further includes a capture and release unit configured to capture a target and deorbit or release the target. The collection of these apparatuses is then employed as multiple, independent and individually operated vehicles launched from a single launch vehicle for the purpose of disposing of multiple debris objects.

36 Claims, 23 Drawing Sheets

(56) References Cited

U.S. PATENT DOCUMENTS

| | | | |
|---|---|---|---|
| 6,969,030 B1* | 11/2005 | Jones et al. | 244/172.5 |
| 7,240,879 B1* | 7/2007 | Cepollina et al. | 244/172.5 |
| 7,293,743 B2* | 11/2007 | Cepollina et al. | 244/172.5 |
| 7,347,110 B1* | 3/2008 | Chen et al. | 73/862.55 |
| 7,513,459 B2* | 4/2009 | Cepollina et al. | 244/158.6 |
| 8,052,092 B2* | 11/2011 | Atmur et al. | 244/158.2 |
| 8,628,044 B2* | 1/2014 | Poulos | 244/172.4 |
| 8,657,235 B2* | 2/2014 | Gregory et al. | 244/158.4 |
| 2004/0026571 A1* | 2/2004 | Scott | 244/158 R |
| 2004/0245405 A1* | 12/2004 | Tchoryk et al. | 244/163 |
| 2005/0040282 A1* | 2/2005 | Wingo | 244/10 |
| 2005/0103939 A1* | 5/2005 | Bischof et al. | 244/161 |
| 2005/0258311 A1* | 11/2005 | Scott | 244/172.4 |
| 2006/0145024 A1* | 7/2006 | Kosmas | 244/172.5 |
| 2006/0151671 A1* | 7/2006 | Kosmas | 244/172.6 |
| 2007/0125910 A1* | 6/2007 | Cepollina et al. | 244/172.6 |
| 2007/0164164 A1* | 7/2007 | Cepollina et al. | 244/158.1 |
| 2007/0228708 A1* | 10/2007 | Fogle et al. | 280/737 |
| 2011/0031352 A1* | 2/2011 | Behrens et al. | 244/172.5 |
| 2011/0198446 A1* | 8/2011 | Knirsch et al. | 244/171.7 |
| 2012/0076629 A1* | 3/2012 | Goff et al. | 414/730 |
| 2012/0225725 A1* | 9/2012 | Velasco-Tang et al. | 463/42 |
| 2013/0082146 A1* | 4/2013 | Kofford | 244/158.7 |
| 2013/0249229 A1* | 9/2013 | Roberts et al. | 294/198 |

\* cited by examiner

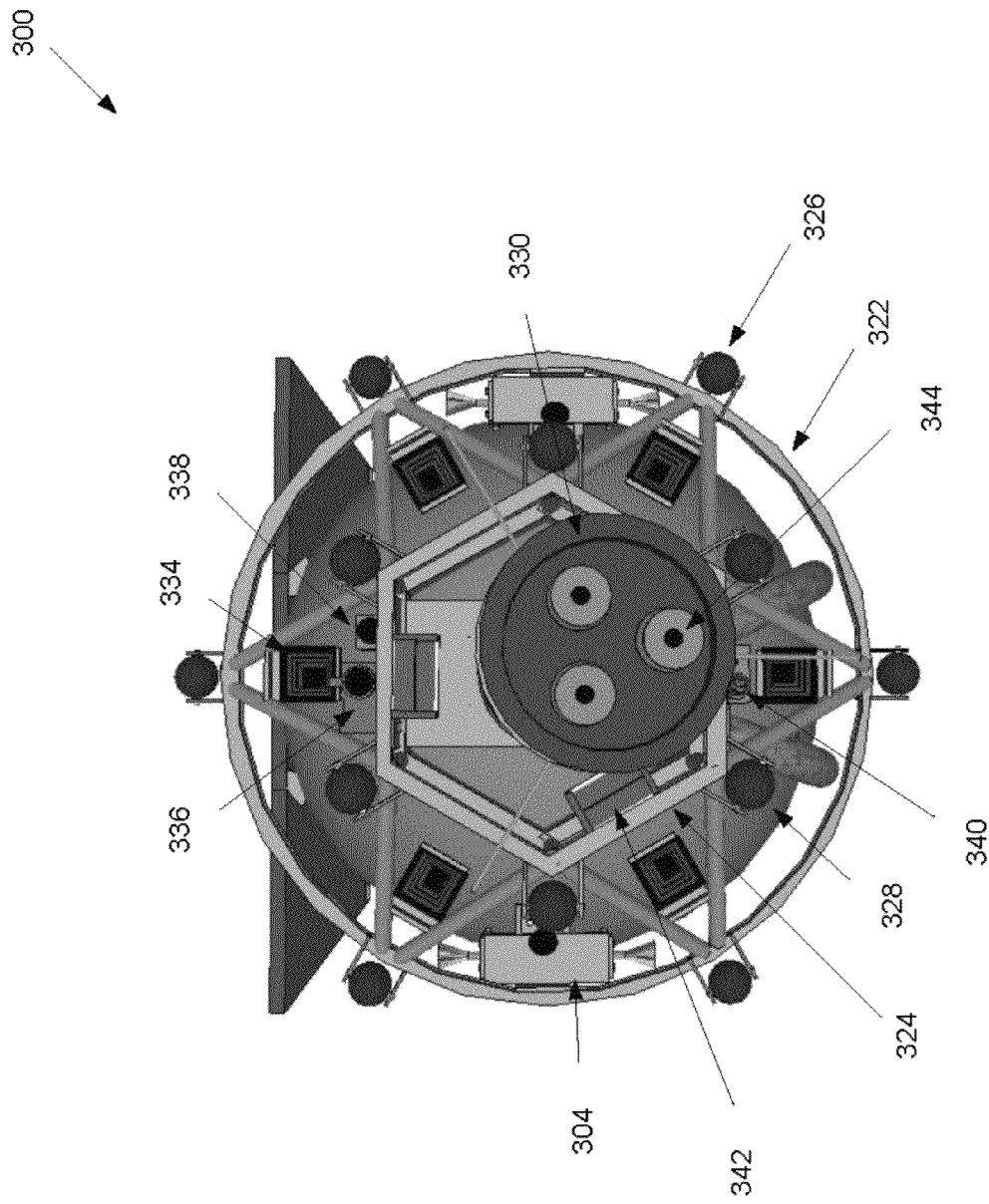

SYSTEM, APPARATUS, AND METHOD FOR ACTIVE DEBRIS REMOVAL

FIELD

The present invention relates to debris removal, and more particularly, to an active debris removal vehicle (ADRV) configured to remove debris in space.

BACKGROUND

Orbital debris in low earth orbit (LEO) is an international problem that threatens the success of scheduled missions and future space ventures. For example, damage from man-made orbital debris is one of the top risks to LEO spaceflight missions. This risk will continue to increase as access to space increases, making orbital debris a global problem that is in need of remediation. Studies have shown that large debris objects are the creation engine for great amounts of smaller, hazardous debris. Thus, an apparatus and method for removal of large, medium, and/or small debris objects may be beneficial to reduce the threat at its source.

SUMMARY

Certain embodiments of the present invention may provide solutions to the problems and needs in the art that have not yet been fully identified or appreciated. For example, an ADRV (hereinafter "vehicle") may be configured to approach a target debris object (hereinafter "target"), assess the characteristics and motion of the target, determine an initial capture trajectory, match the rates of the target, execute a capture maneuver and control sequence on the target, capture and deorbit the target.

In one embodiment, an apparatus includes a spacecraft control unit configured to guide and navigate the apparatus to a target. The apparatus also includes a dynamic object characterization unit configured to characterize movement, and a capture feature, of the target. The apparatus further includes a capture and release unit configured to capture the target and release the target.

In another embodiment of the present invention, a method is provided. The method includes performing, by an apparatus, a rendezvous procedure with a target. The method also includes analyzing, by the apparatus, the target prior to capturing the target. The method further includes capturing, by the apparatus, the target based on the analysis of the target.

In yet another embodiment of the present invention, a system is provided. The system includes a plurality of vehicles. Each vehicle includes, a cowcatcher configured to protect instruments and react launch loads on the vehicle. The system also includes a launch vehicle. The launch vehicle includes a payload that includes a plurality of vehicles. The vehicles may be oriented upside down in conventional terms for launch systems in the payload.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 3A-E illustrate a vehicle for capturing debris, according to an embodiment of the present invention.

DETAILED DESCRIPTION OF THE EMBODIMENTS

Figure 1A:
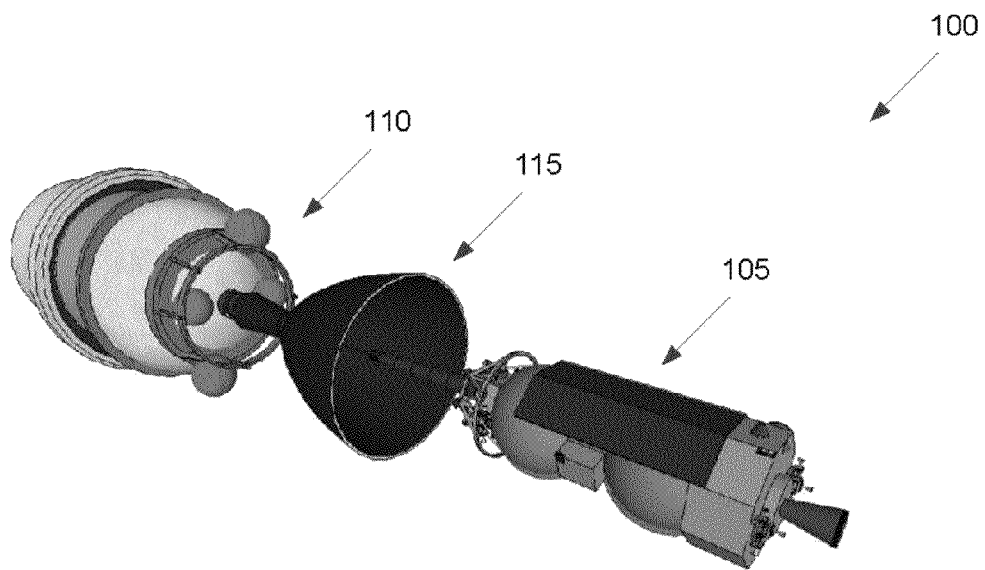
FIGS. 1A and 1B illustrate a terminal approach and capture sequence of a target, according to an embodiment of the present invention.

One or more embodiments described herein employ a low-cost, lightweight high mass fraction vehicle that performs, an autonomous rendezvous, approach, and capture of a non-cooperative tumbling target. The vehicle may perform a mated maneuver of the combined vehicle (i.e., vehicle and target) to accomplish safe targeted deorbit. This document describes a spacecraft control system (SCS), a debris object characterization system (DOCS) and a capture and release system (CARS) that can improve, by at least two orders of magnitude, the current state-of-the-art in capabilities inherent to automated rendezvous and docking technology for tumbling rates of a target of up to 25 degrees per second. However, in some embodiments, more complex object rotations may be accounted for, particularly as computing technology increases.

SCS, or the guidance, navigation and control system, may provide vehicle control during all phases of the mission. SCS may include flight software modules and associated hardware components to provide efficient, propellant conscious control of the vehicle during a wide range of activities. Such activities may include initial separation from the launch vehicle, rendezvous, and associated burns during quiescent periods where communication, power, and thermal management are required, rendezvous and associated burns during a highly dynamic period of target approach and capture, and managing the significant changes in mass properties of the combined vehicle during de-spin, maneuvering, and disposal. The guidance, control and navigation system may also provide guidance and navigation information to enable attitude control, rendezvous, and targeted deorbit of the target. The vehicle must be highly maneuverable to accommodate the potential for target rotation rates of approximately 25 degrees per second, although different rotation rates may be accounted for in other embodiments.

DOCS enables the vehicle to characterize the movement and capture feature of the target. DOCS may provide initialization information to the guidance, navigation, and control system to enable approach, and serve as an active sensor or sensors to the guidance, navigation, and control system from approach through contact with the target. DOCS may use a light detection and ranging (LIDAR) based system, as well as a visual, noise radar, and/or proximity sensors. Some of these components may also be used during the rendezvous phase of the mission.

In some embodiments, multiple vehicles may be delivered to LEO on a single launch, and each vehicle may be assigned to different targets within the same inclination group. The booster upper stage may be used to make small plane corrections between vehicle deployments. The vehicles may remain in LEO parking orbits until the orbit planes precess into the phantom planes of their respective targets. It should be noted that one or more vehicles may be held back to complete the deorbit of an object that is too massive for a single ADRV to dispose of on its own, or as a level of redundancy for higher priority targets completed earlier in the mission. Rocket body targets may presently be expected to be in any inclination, up to sun synchronous orbits, with rotation rates between 0 and 25 degrees per second, altitudes up to 1,000 kilometers, and masses up to 1.5 metric tons. These parameters represent more than 75% of the more than 1,800 rocket bodies currently in LEO.

CARS may allow the vehicle to capture and ultimately hard mate with the target. CARS may provide a method to physically capture the target and provide a firm connection to the target for subsequent control and maneuvering. CARS may also have the ability to release the target, if necessary, due to propellant margins, etc. For example, if propellant margins do not support a full deorbit, the vehicle may sufficiently lower the orbit of the target (less than 25 year lifetime, for example), and release the target such that the vehicle itself can safely deorbit.

It should be appreciated that each vehicle, after deployment from the launch vehicle, may perform orbit raising and rendezvous maneuvers to reach an assigned target object. The vehicles may perform proximity operations to collect data on a dynamic state and a physical condition of the target. The vehicle may transit to an intersection point between an orbit plane and a target rotation plane, and initiate an approach and capture sequence. Once the vehicle has captured the target, the vehicle can control the target attitude. The vehicle can then wait for an opportunity to deorbit the target to a safe location, performing the deorbit maneuver near apoapse.

Figure 1B:
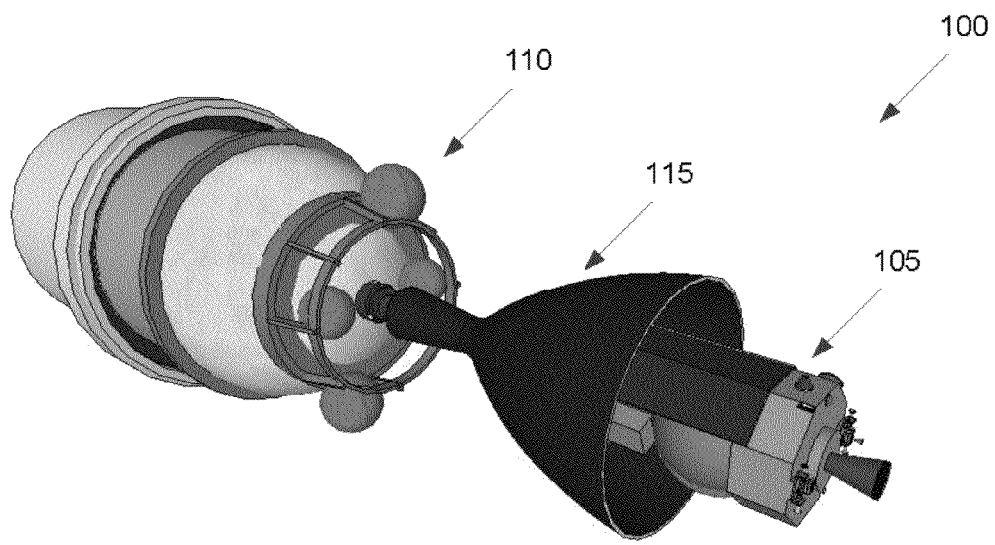

FIGS. 1A and 1B illustrate a terminal, approach and capture sequence 100 of a target 110, according to an embodiment of the present invention. Process 100 begins with the launch of a launch vehicle, such as a rocket, containing a plurality of vehicles. It should be appreciated that the vehicles may be included in a payload of the launch vehicle. The vehicles, which are tuned to their respective targets, may be separated at a pre-defined orbit. In one embodiment, the launch vehicle may release in succession each of the vehicles in 2 to 5 minute intervals, for example, but any desired interval or differing time intervals from vehicle to vehicle, may be used.

It should be appreciated that each vehicle may separate from the upper stage of the launch vehicle after being placed in LEO. Separate orbital adjustment burns may be executed in the upper stage to optimize the trajectory for each vehicle. The vehicles may be placed in their pre-mission planned orbits to begin the initial stages of the on-orbit rendezvous process. The upper stage of the launch vehicle may be utilized for slight inclination changes for some of the vehicles, depending on the pre-mission design and remaining delta-V capability. Any burns may be performed in the first few orbits of the mission due to limited lifetime of the batteries and limited starts of the upper stage.

Prior to separation from the upper stage, the guidance, navigation, and control system, and the propulsion systems of the vehicle, may be automatically activated. For a single vehicle mission, separation may be initiated in a predetermined attitude. A small impulse may be imparted by a spring force to ensure there is an "opening rate" between the upper stage and vehicle. Following separation, the vehicle may automatically initiate its preplanned core system activation sequence.

While the first vehicle that is released may perform automatic rendezvous with the pre-assigned target, the other vehicles may loiter in a parking orbit until their pre-assigned target planes are nearly aligned. The rendezvous phase may begin with the first large burn, which begins raising the orbit of the vehicle from the insertion altitude to that of the target. This begins when the two orbital planes are properly aligned, or as a result of incorporating small plane change maneuvers. This may have occurred at launch, or days/weeks/months afterward, depending on the pre-mission trajectory design.

In some embodiments, the vehicle may perform an autonomous rendezvous with target information provided by ground control. The vehicle utilizes a minimum propellant trajectory during the rendezvous. During this stage, the ground control may monitor the progress of each vehicle, and adjust trajectory planes and propellant margins as required, thus optimizing trajectory and propellant use throughout the rendezvous profile.

It should be appreciated that before the rendezvous phase can begin, the other vehicles may be in a loiter phase for hours, or even days, depending on how long it takes nodal precession effects to affect the trajectory of the vehicle.

During loiter phase, the vehicle may be in a quiescent mode with most systems powered down and batteries maintained at maximum charge. During this timeframe, the vehicle and the ground control may communicate for short periods every day (or at any desired interval or whenever desired) for system checks, timeline and sequencing updates, etc. Periods of more extensive communication may also occur during this timeframe for system checkout of the approach sensors and related approach and capture systems.

Daily system checks may also be used to assess system performance and capability to ensure continued mission success. Such a configuration allows for any updates to vehicle configuration data and timeline and sequencing information.

More intensive system checks may be performed to ensure approach and capture systems are ready prior to completion of the rendezvous phase.

While the other vehicles are loitering in orbit, the first vehicle 105 may assess the state of target 110. For example, vehicle 105 may initiate station keeping at a predetermined distance to survey and fully characterize the dynamics and condition of target 110. This information may be used to calculate and execute an approach and capture maneuver strategy. For example, during approach, when vehicle 105 is in close proximity to the capture feature of target 110 (e.g., engine nozzle 115), vehicle 105 deploys initial capture mechanisms that control relative motion (see FIG. 1A), followed by the final capture mechanism that enables a hard dock to facilitate control and maneuvering of the combined vehicle (see FIG. 1B).

Following hard dock, vehicle 105 may perform a series of pre-programmed firings of its control system thrusters to quantify the dynamics of the combined vehicle. Vehicle 105 may evaluate the response of the combined vehicle to these firings, and use the results to configure its control system for stabilization and control of the combination. To complete the mission, vehicle 105 performs an automatic targeted, controlled deorbit burn to safely dispose the combined vehicle, completing the debris remediation mission.

Figure 2:
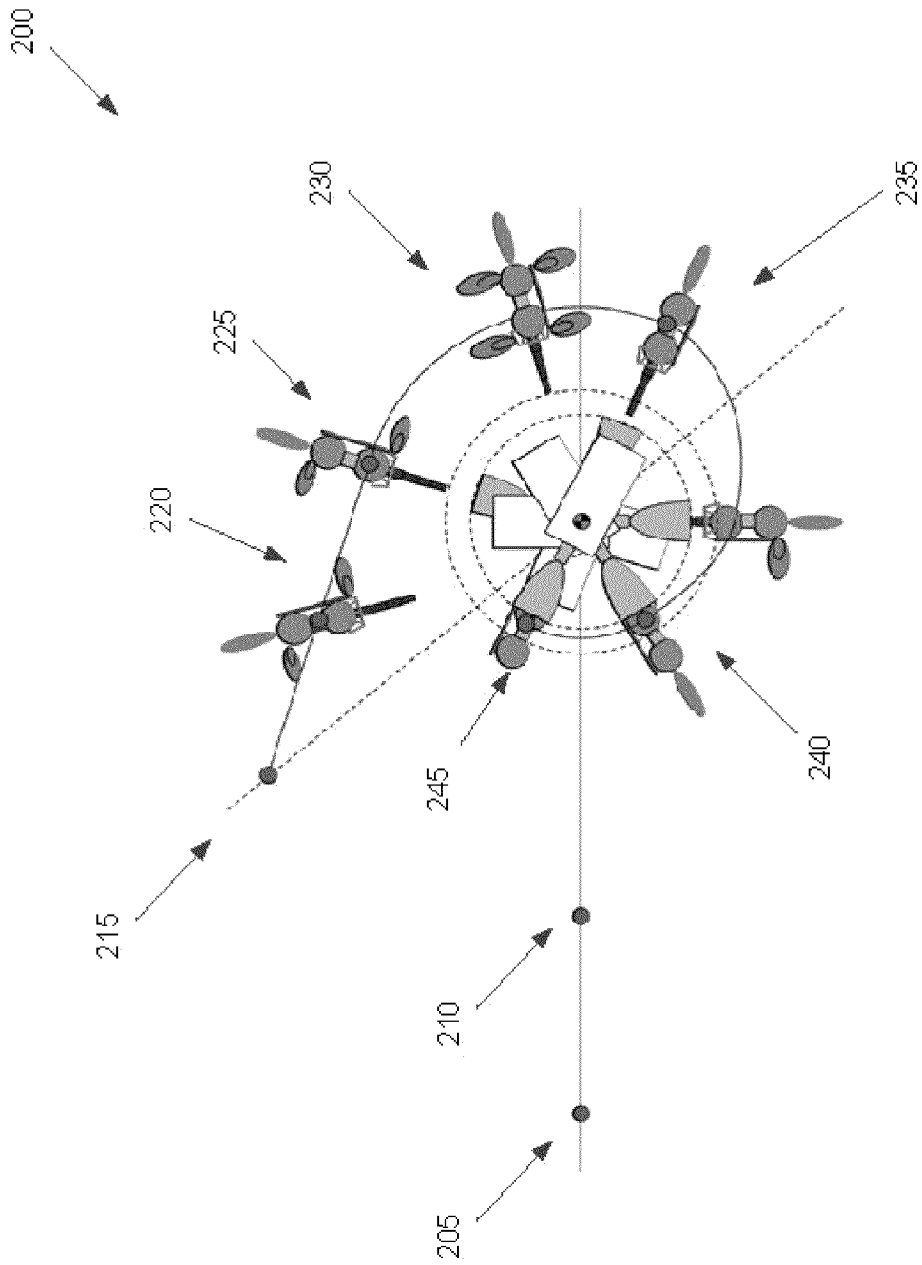
FIG. 2 illustrates an approach and capture sequence of a target, according to an embodiment of the present invention.

FIG. 2 illustrates an approach and capture process 200 of the target, according to an embodiment of the present invention. When rendezvousing with the target during approach, the vehicle may be approximately 100 to 150 meters from the target. As the vehicle is moving towards the target, there is a stable station keeping point 205 in front of, and behind, the target. At this point, the vehicle and the target may be at the same orbit, approximately the same altitude, and moving around together. This allows the vehicle to stay in close proximity to the target, and allows limited use of the propellant during the capture sequence.

While the vehicle is at stable station keeping point 205, the vehicle may assess the state of the target to determine whether the vehicle should capture the target or move to a secondary target. The secondary target may be a pre-assigned target in the event that capture of the primary target is not feasible. Target state assessment may occur in a station keeping position approximately 12 meters from the target and likely on the velocity vector, or v-bar. In this position, the vehicle may fully survey the target with visual and other sensors to characterize the behavior (e.g., dynamic rates, position, etc.), as well as the overall condition of the target. The attitude in this position should be acceptable for communication coverage with the ground control. This time frame allows for sensor calibration and functional assessments.

The vehicle may conduct an analysis and calculate an approach solution with the target. It should be appreciated that the ground control may have visual contact and insight into the calculated approach solution to verify the solution, as well as provide an evaluation of the target's condition. This information may be used to provide commands for the vehicle to approach the target. Communication coverage, orbital position, lighting, target behavior, propellant margin, and target condition may factor into the approach strategy and the decision to proceed, or not to proceed, with approaching the target.

If this assessment deems the primary target as unapproachable for capture, the ground control may divert operations to a secondary target. The ground team, prior to authorizing the vehicle to proceed with capturing the target, may evaluate each of the above-mentioned factors. If extended station keeping is required prior to approach, the vehicle may distance itself from the target such that propellant usage and risk of unintended collision are reduced.

The end of this phase may involve sensor handoff from rendezvous sensors to the sensors that provide the data for final approach and capture. As the vehicle begins to approach the target, some or all of the rendezvous sensors that have been feeding information to the guidance and control system may transition to the DOCS sensors. The DOCS sensors in this embodiment are configured to act as the "eyes" of the guidance and control system during the approach and capture operations.

It should be appreciated that the capture phase may begin on the v-bar (i.e., stable station keeping point 205 or proximity station keeping point 210) following survey data analysis of the target by both the vehicle and the ground control. At this point, the vehicle may be ready to proceed with capturing the target, with all sensors and systems configured for approach operations. It should be appreciated that the station keeping period on the v-bar allows for sufficient time to evaluate all systems, survey data, and evaluate the target condition in a relative position that is not costly for propellant. Also, the timing of the capture sequence should be carried out to minimize the time limit post-capture before the deorbit and/or disposal maneuver.

The vehicle may include a preconfigured system prior to receiving the command to approach the target. Each sensor required for the capture phase may be in an active state. This configuration may maximize the ability of the ground control to ensure that the capture trajectory and systems of the vehicle are ready for the dynamic capture operations. The ground control may issue a command to proceed with approach and capture of the target, thus causing the vehicle to retract the solar arrays and transfer the load to the battery to complete capture operations. Because the vehicle is utilizing the battery during this phase, the remainder of the mission occurs quickly with an increased operational tempo to ensure that adequate power is available for capture, de-spin, and de-orbit of the target.

The mission may proceed on the trajectory shown in FIG. 2—that is, transit to the intersection of planes. The vehicle may match rates with the target, and approach along a corridor centered on the capture feature, e.g. the engine nozzle. Operations from this point through stabilization of the combined vehicle may be autonomous. Onboard software modules may monitor progress based on predefined criteria, which may include corridor position tolerances, body rates, propellant consumption rates and levels, etc., and may abort the approach if any of these conditions have been violated. The ground control may also continuously monitor the progress of the approach operation, and may issue an abort command at any time.

Because there may be a finite risk of failure to achieve the mission objectives, in attempting to perform all operations at once, the trajectory capture phase may be split into two steps. The first dynamic step of the approach and capture sequence may begin following the "go to proceed" command from the ground control. The maneuver involves vehicle rotation and translation to place the vehicle in the primary plane of rotation of the target capture feature. Since this requires the vehicle to move out of the stable orbital dynamics relative position on the v-bar, orbital dynamics effects begin to impact the relative positions of the ADRV and the target. Thus, in addition to the use of propellant for the translation and associated rotation to the new plane, translation thruster firings may be required to maintain relative position for any length of time. The length of time to accomplish this translation may depend on the capabilities of the control system of the vehicle, as well as the measured dynamics of the target, with the goal of minimizing propellant use (translation and rotation propellant versus relative motion control propellant).

In the initiate capture sequence 215, the vehicle may hold position and attitude once in the rotation plane until the target feature (nozzle) reaches the appropriate position in its rotation, at which time the vehicle may initiate translation and rotation 220 thrusting to enter a radial pattern 225 (or orbit) at approximately 10 meters from the center of gravity of the target. Because the timing of this sequence is crucial, when the vehicle enters the radial pattern, the capture feature will be in the field of view of the sensor positioned near the longitudinal axis (X-axis) of the vehicle. The vehicle rotation rate imparted by this maneuver may directly match the rotation rate of the target, and the amount of translation may be proportional to the rotation rate of the target, such that the vehicle can maintain the proper relative position on the radial pattern.

When entering the radial pattern, the translation and rotation thrusting is configured to place the vehicle in the proper orientation on the radial pattern with the X-axis of the vehicle positioned near the target capture feature. To maintain the relative position on the radial pattern, the vehicle is configured to balance the resultant centripetal acceleration required to hold this pattern. This may require constant thrusting (or thruster pulsing) in the +X direction. The amount of acceleration imparted is directly related to the rotation rate of the target and the distance from the center of gravity. This phase of the sequence marks the beginning of the high propellant consumption period, which requires nearly constant thrusting to maintain position.

The vehicle may enter an adjust and stabilize phase 230. In this phase, the onboard sensors can provide accurate position data to the SCS. The SCS can then utilize the appropriate thrusters to fly out any errors, positioning the vehicle in the proper relative position and attitude on the radial pattern with the X-axis position on the centerline of the capture feature. Once the onboard system has satisfied its position and attitude error requirements, the final approach can be initiated.

The final approach is initiated 235 from approximately the 10 meter radial pattern by increasing the +X-axis thrusting that was required to maintain stable relative motion on the radial pattern. As the vehicle begins moving closer to the target, the centripetal acceleration effects are lessened due to the smaller distance to the center of gravity of the target. This also means that the target may need to slow its tangential velocity or the vehicle will fly in front of the nozzle of the target.

The proximity operations sensors may be configured to continue to output high rate relative position information to enable the SCS to maintain its position on the approach corridor. Additional sensors may also be used as the CARS gets within 1 to 2 meters of the nozzle. When these sensor(s), in addition to the proximity operations sensors, detect approximately 1 meter to structural contact (at this point, part of CARS is already inside the volume of the nozzle), the SCS may be configured to increase the closure rate to ensure that CARS fully contacts the interior of the nozzle, and any position errors are driven out by the self-centering feature of the nozzle and momentum of the vehicle. The vehicle may continue thrusting in the +X-axis direction through structural contact 240 to ensure that the CARS and the vehicle do not "bounce" out of the nozzle.

In structural contact phase 240, when the sensors on the end of the CARS detect that the capture device has passed through the throat of the engine of the target, the capture sequence is automatically initiated. Within a period of 1 to 2 seconds, the capture system may be fully activated, and the vehicle control system will cease attitude and position thrusting, thus entering a free drift, with the exception of +X-axis thrusting, which will be maintained until the capture system confirms target capture. Following capture confirmation, all thrusters can cease operation.

In the hard dock capture completion phase 245, the vehicle may remain in free drift until the capture system completes all operations for hard dock. This includes full activation of the throat mechanism, and completing mechanical latching of the nozzle rim. When hard dock is confirmed, the onboard sequencing software modules can automatically shift to the control portion of the sequence. There may be a pause at this point to allow ground control to confirm hard dock prior to beginning the control sequence.

Once the vehicle has hard docked with the target, the mass properties of the combined vehicle may have changed. To enable control of the combined vehicle, the vehicle may configure its control system with pre-mission generated parameters already onboard, and with any information gathered from the pre-capture survey. Prior to executing control operations, the control system of the vehicle may automatically configure itself with the appropriate pre-mission configuration, as well as any updates provided by the ground control or from the capture operations. It should be appreciated that control performance information may be gathered from previous capture and control operations (even from the current mission), thereby minimizing propellant consumption.

The vehicle may automatically begin the control process once the onboard system confirms that the capture operations are complete. Due to antenna blockage from the target, as well as potentially high rotation rates, the vehicle may not be able to communicate continuously with ground control. Therefore, the vehicle may be equipped with an onboard indication of capture, and may proceed with the pre-planned control operations.

The vehicle may begin a series of pre-programmed test inputs (PTIs). The PTIs include a thruster firing for a given duration of time, followed by a period of free drift that allows on-board sensors to determine the effects of the thruster firing, and utilize the measured response to determine the combined vehicle's mass properties. The PTIs may continue until the vehicle has minimized the uncertainties in the mass properties to the required level to enable initial control.

This process may take some time, depending on the response of the combined vehicle to the PTIs. All firings may be performed in a direction that reduces existing rotation rates to minimize subsequent propellant usage when a closed loop control is implemented. Flight control configuration data can be transmitted to ground control for evaluation, as well as for use on subsequent missions to other similar targets. This information may be beneficial for the ground control because the ground control may be able evaluate the state of the target and optimize the configuration of future missions (even ones that are currently underway).

Following calibration of the flight control system using the PTIs, the first closed loop control operation may be nulling the uncontrolled tumble and spin of the combined vehicle. It should be noted that some level of spin may provide a stabilizing effect, and may not be necessary to completely eliminate the spin. The vehicle may monitor propellant usage during this activity and break out of the sequence or switch to free drift when propellant "bingo" values are reached.

Once control is established and maintained, the vehicle can maneuver the combined vehicle to an attitude that is optimum for communication with the ground control and power generation to prepare for disposal commands and operations. At the appropriate point in the trajectory, and prior to the deorbit, the vehicle may perform an attitude maneuver to place the combined vehicle in the proper orientation to perform a small perigee adjust burn with the deorbit engine. The combined vehicle response (acceleration, body rates, thruster response, etc.) to the small burn may provide additional data and confidence to ensure the complete deorbit burn can be performed at the targeted time, and within the expected propellant budget (bingo value).

Once captured and stabilized, the final aspect of the mission is controlled deorbit. This process may be coordinated with, for example, the Department of Defense (DoD) to ensure a clear entry trajectory and prevent collision with another spacecraft. Coordination with the Federal Aviation Administration (FAA), Coast Guard, and/or DoD may be required to ensure that the disposal airspace and waters are clear of aircraft and surface ships.

During this process, the vehicle can perform disposal operations upon receiving appropriate de-orbit configuration commands from the ground control. The vehicle is configured to maneuver the combined vehicle and perform the targeted disposal burn per command from the ground control. Ground control command information may include the deorbit target information (i.e. post-burn targeted trajectory, time of ignition, burn attitude, etc.), as well as the authority to proceed with disposal.

During the deorbit burn, the onboard and ground systems are configured to monitor the burn progress, propellant usage, system status, etc., to determine whether the combined vehicle can meet the disposal targets. The burn will be aborted for any condition that will result in not meeting the expected target. If deorbit targets are unable to be met, aborting the burn to allow troubleshooting and deorbit re-planning to occur are necessary to ensure a safe disposal of the target The vehicle may release the target when the propellant bingo number indicates sufficient propellant remains to self-deorbit. Release is generally not nominally planned, but may be desirable for cases where the target orbit can be lowered into the 25 year lifetime range, and the vehicle can subsequently self-deorbit with the remaining propellant.

The vehicle will continue to transmit status telemetry to the ground control until system failure due to entry into the Earth's atmosphere, or due to loss of power/propellant if vehicle consumables are expired prior to atmospheric reentry. This data may provide information that is valuable for future disposal missions.

Figure 3A:
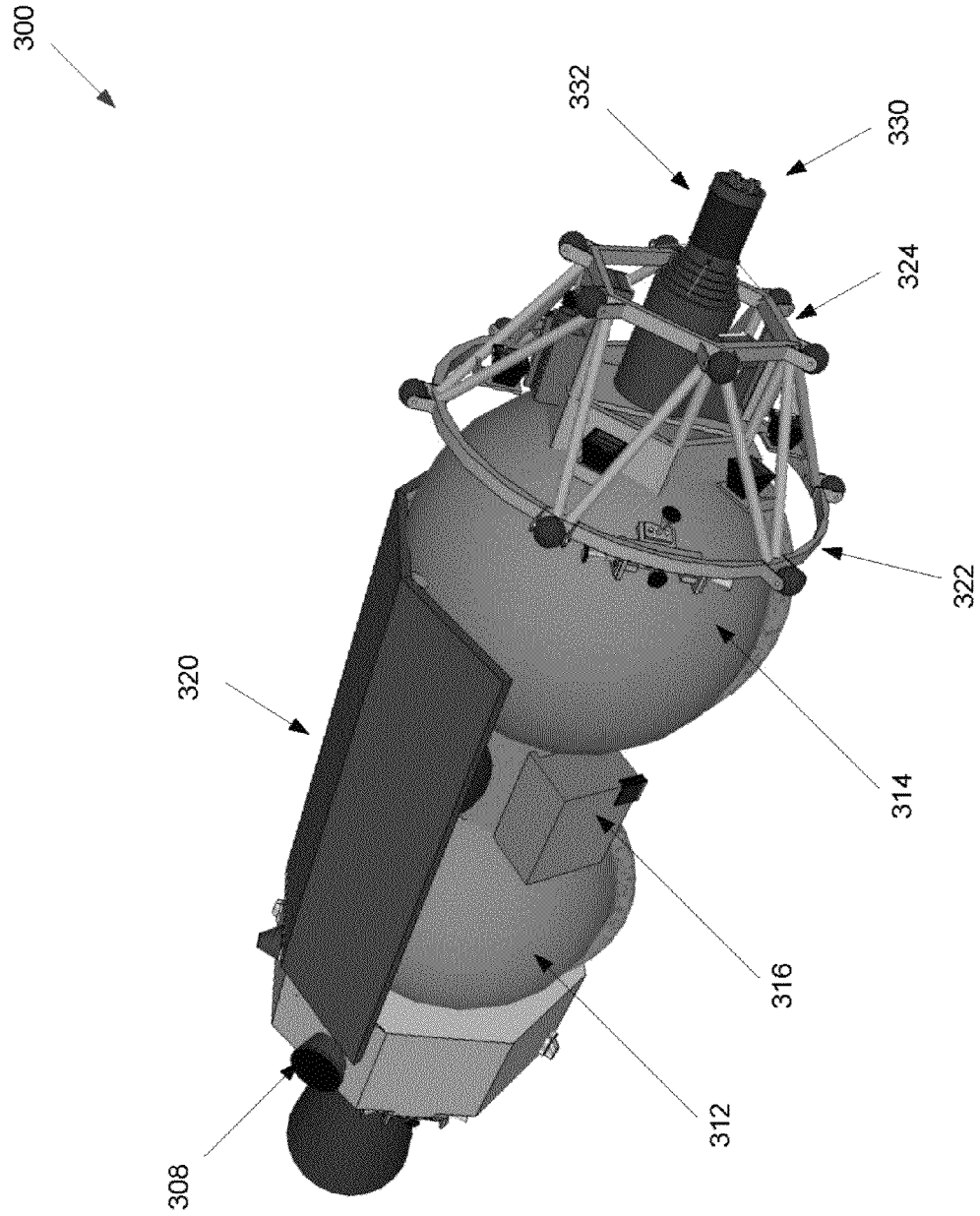
Figure 3B:
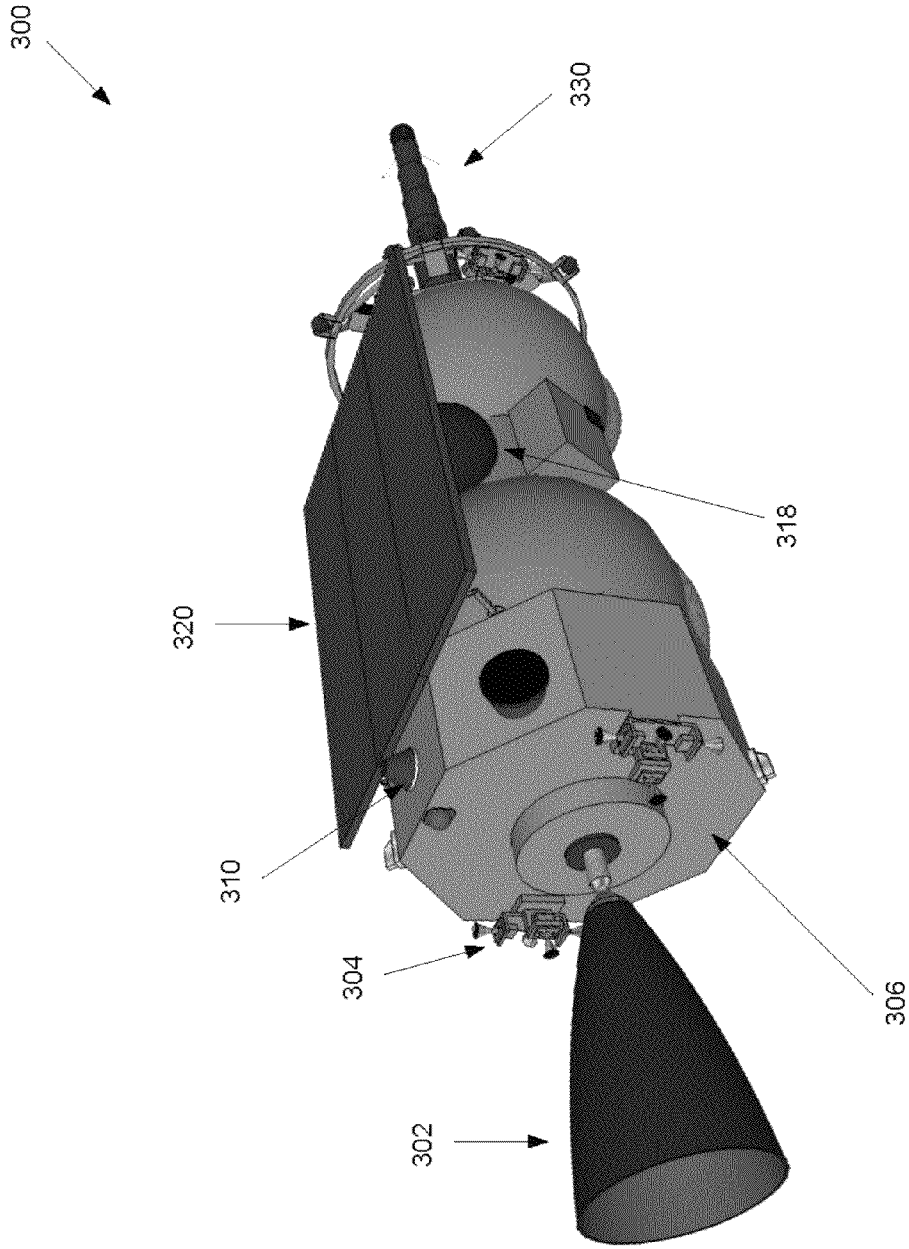
Figure 3D:
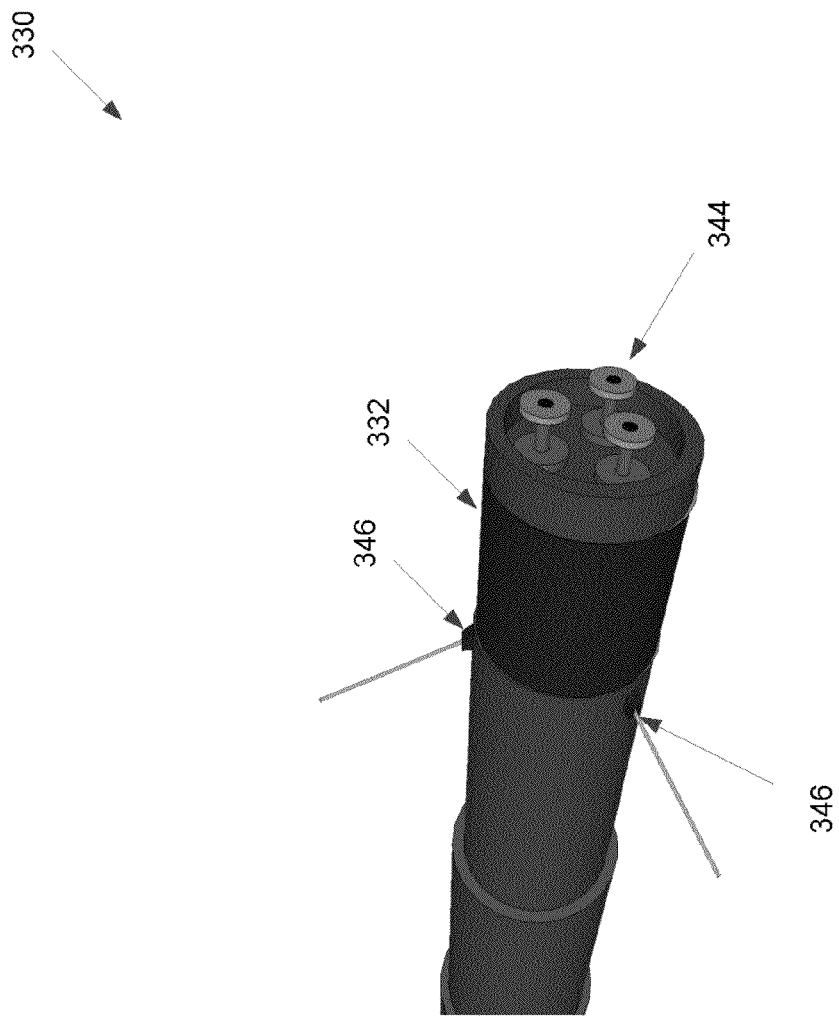

FIGS. 3A and 3B illustrate a vehicle 300 for capturing debris, according to an embodiment of the present invention. FIGS. 3A and 3B illustrate two views of vehicle 300, with FIG. 3B showing mast 330 of CARS being extended and FIG. 3A showing mast 330 being retracted. A helium system may be utilized to pressurize the helium from helium tank 318 to extend mast 330, but any other suitable gas may be used. Mast 330 includes a snare 332 that can be inflated from the helium present in mast 330. Snare 332 can be inflated inside a combustion chamber of the target in order to hard dock with the target, when mast 330 is inside the nozzle of the target. The front of mast 330 includes a plurality of tip sensors 344 and a plurality of throat sensors. See FIGS. 3C and 3D. Tip sensors 344 and throat sensors 346 ensure that the capture and release mechanism of vehicle 300 is actuated quickly upon snare 332 passing through the throat of the nozzle of the target and into the combustion chamber of the target.

Vehicle 300 also includes a cowcatcher (FIG. 3C). The cowcatcher is formed by an outer diameter ring 322 and a smaller diameter ring 324. The cowcatcher includes a gridded frame to protect vehicle 300 when entering the nozzle of the target. Smaller ring 324 of the cowcatcher also allows vehicle 300 to be loaded in a launch vehicle upside down. Because vehicle 300 is loaded in the payload of the launch vehicle upside down, the cowcatcher provides protection to the sensors, mast, camera, rollers, and any other mechanism on the front of vehicle 300, as well as react launch loads on vehicle 300.

As shown in FIG. 3C, vehicle 300 includes a plurality of rollers that roll against the inside of the nozzle and guide vehicle 300 when docking with the target. In this embodiment, vehicle 300 includes two sets, of rollers 326, 328. First set of rollers 326 is coupled to larger diameter ring 322 and second set of rollers 328 is coupled to smaller diameter ring 324 of the cowcatcher.

Figure 3E:
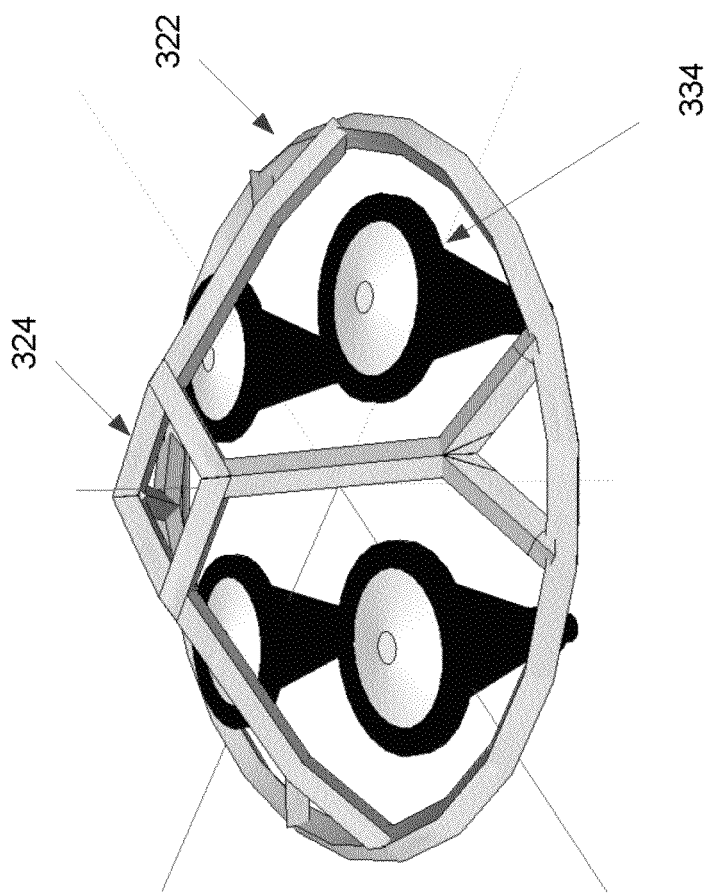

Vehicle 300 also includes a plurality of noise radars 334. FIG. 3E illustrate another view of noise radars 334, according to an embodiment of the present invention. In this embodiment, noise radars 334 may be configured to capture signature changes of the target and compare the signature to a preloaded radar cross-section model of the target to characterize a tumble of the target. Additionally, the rotation speed of the target, the range to the target, the rate at which the range changes, the bearing, and any parameter necessary to effect a successfully guided capture, is collected. Each noise radar 334 is operably coupled to a second tank 314 of vehicle 300. Each noise radar 334 is configured to project a beam (1 degree beam per sensor) to, and receive a beam from, the target to determine the location of nozzle of the target. It should be appreciated that noise radars 334 in this embodiment, operate under a radio frequency in the W-band with an embedded Doppler tone. In certain embodiments, nominal array of four radar channels, with two polarized vertically and two polarized horizontally, may provide sixteen matched filter permutations, and is expected to provide high resolution target characterization. However, depending on the configuration of vehicle 300, noise radars 334 may operate under other frequency bands or in different polarization configurations, as would be appreciated by a person of ordinary skill in the art.

Vehicle 300 also includes a plurality of cameras. In this embodiment, vehicle 300 includes three cameras 336, 338, 340. However, it should be appreciated that vehicle 300 may include any number of cameras depending on design choice. Cameras 336, 338, 340 are configured to assist vehicle 300 to capture, or dock with, the target.

In this embodiment, camera 336 is an infrared camera, but may be any camera that may be appreciated by a person of ordinary skill in the art. Because vehicle 300 requires a visual lock with the target at all times, camera 336 is utilized to provide a visual of the target during day and night. In other words, this camera allows the target to be rendered during orbital darkness.

Cameras 338, 340 are utilized for the natural feature image recognition (NFIR) system. The NFIR system is similar to the noise radar system, and acts as a verification system to determine the location of the nozzle of the target. See, for example, FIG. 17.

Vehicle 300 may also include a plurality of airbags 342. Because vehicle 300 may enter the nozzle of the target at an angle, airbags 342 are configured to deploy or inflate inside the nozzle of the target to center vehicle 300. In certain embodiments, airbags 342 may not be utilized depending on the conical shape or configuration of the cowcatcher. For example, depending on the shape of the cowcatcher, vehicle 300 may automatically center inside, the nozzle of the target during the capture sequence.

It should be appreciated that the spherical tanks (first tank 312 and second tank 314) hold the fuel and oxidizer, and are generally the largest and heaviest components of vehicle 300.

The spherical tanks, using a combination of their physical design and internal pressurization, form the structural backbone of vehicle 300. The other large structural component of the vehicle is the "cowcatcher" structure at the front of the vehicle. A smaller structure 306 exists at the rear of vehicle 300 to mount the avionics, and propulsion compartment to the rear of the second tank 314.

The propellant mass fraction of vehicle 300, the ratio of the mass, of propellant to the mass of vehicle 300, may range between 0.6 and 0.65. This means that the mass of vehicle 300 may be more than 60% fuel. Both tanks 312, 314 may be held together with a cylindrical ring (not shown) structurally fastened between tanks 312, 314. The valves, regulators, and plumbing route within this volume and out to the main propulsion system and reaction control system. The two helium spheres and two batteries can be mounted to this ring, near the geometric center of the spacecraft.

It should be appreciated that vehicle 300 may be equipped with two helium tanks 318 and two batteries 316. The capacity of each helium tank 318 or battery 316 is designed to be half of that required to perform the mission. This may allow vehicle 300 to safely perform a self-deorbit maneuver if one of helium tanks 318 were to leak, if one of batteries 316 were to fail, or a combination thereof.

Vehicle 300 may also include a solar array 320 to collect power, and to shield propellant tanks 312, 314 from the sun. When vehicle 300 enters the nozzle of the target, solar array 320 may be folded and turned to an off state, as shown in FIG. 3A. When solar array 320 is folded and turned to an off state, vehicle 300 is operated using the power from batteries 316. However, when vehicle 300 is deployed, from the launch vehicle and up to rendezvous with the target, solar array 320 may be expanded as shown in FIG. 3B to power vehicle 300.

At the rear of vehicle 300, structure 306 includes a star tracker, power distribution unit, avionics, communication and global positioning system (GPS) unit, video antennas, and any other mechanism that would be appreciated by a person of ordinary skill in the art. The flat panels on structure 306 serves as radiators for vehicle 300.

Star tracker optics assembly 308 may allow a navigation base of a bus inertial measurement unit (IMU) to be periodically updated due to drift by comparing and correcting offsets in the observed and expected star field positions. Vehicle 300 may also include at least two S-band telemetry/communication antennas 310 configured to assist vehicle 300 with command and telemetry. For example, telemetry and communications antennas 310 may monitor and update the attitude of vehicle 300 and transmit the monitored and updated attitude of vehicle 300 to ground control. A co-located GPS navigation antenna may also be used to assist with orbit navigation and maneuver planning.

Bi-propellant propulsion engine 302 is attached to the rear of vehicle 300 and is configured to propel vehicle 300 forward through, for example, space. Vehicle 300 may also be equipped with at least four bi-propellant units 304 to turn vehicle 300. There may be two bi-propellant units 304 at the front of vehicle 300, and two bi-propellant units 304 at the rear of vehicle 300.

Figure 4A:
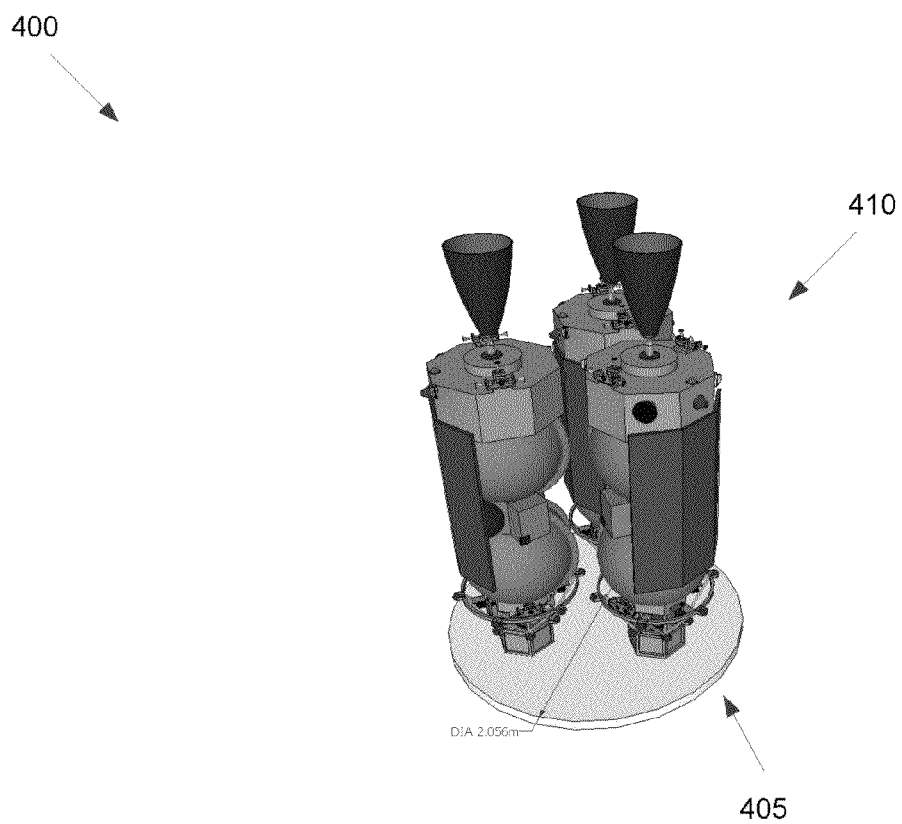
FIGS. 4A-4C illustrate clustering of a plurality of vehicles as a payload of a launch vehicle, according to an embodiment of the present invention.
Figure 4B:
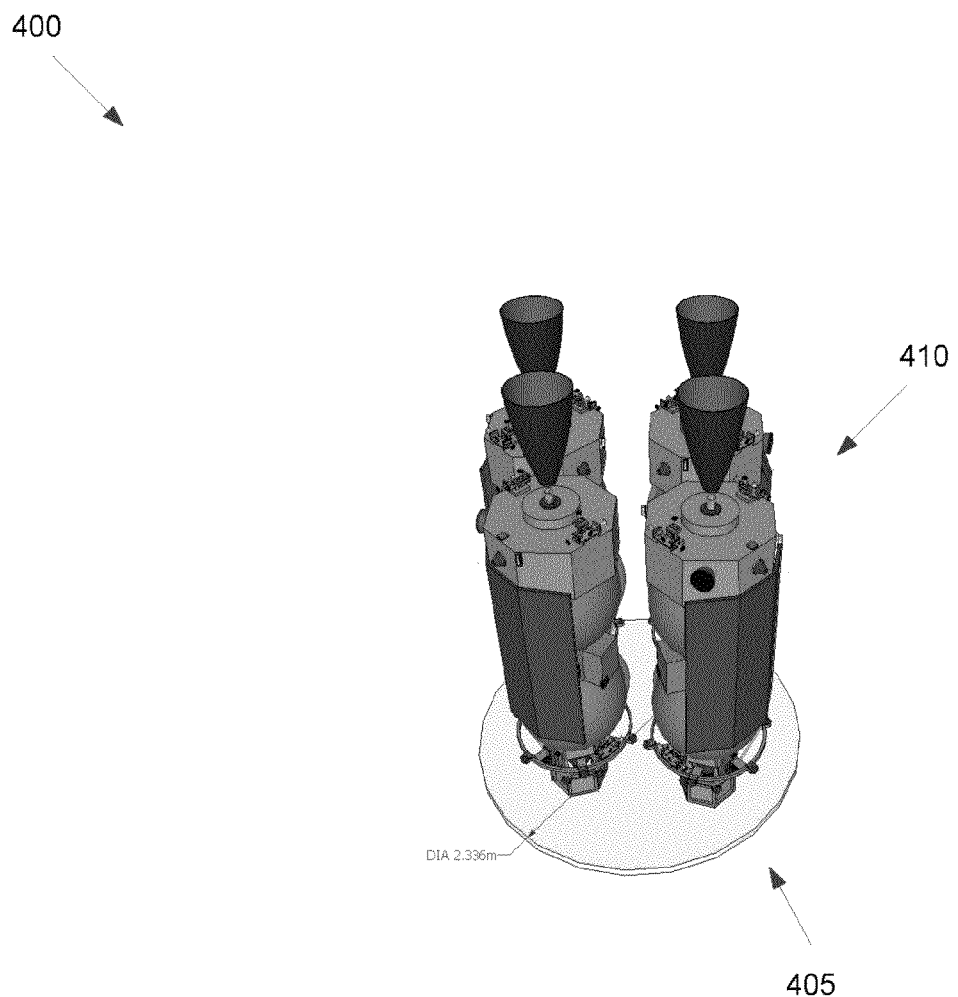
Figure 4C:
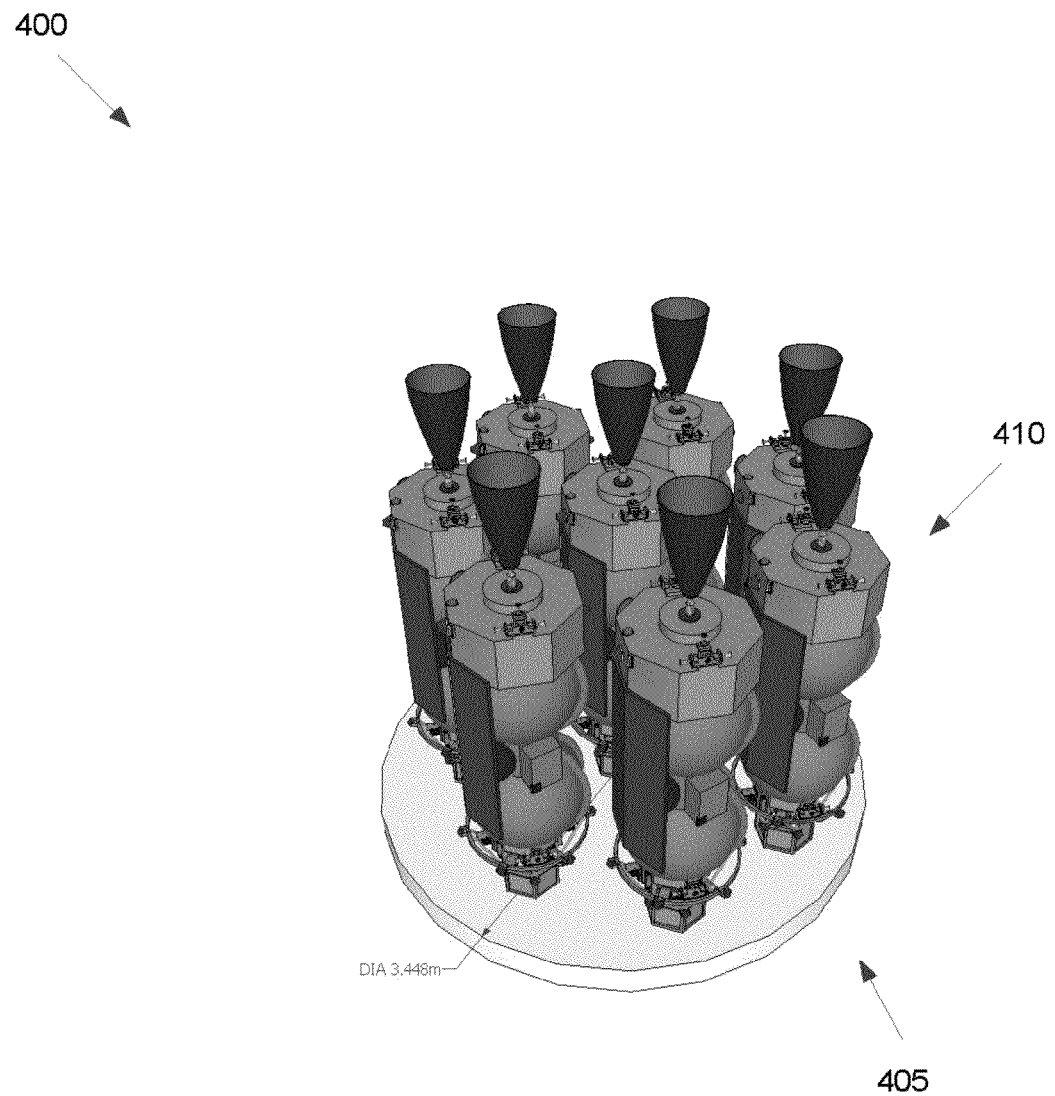

FIGS. 4A-4C illustrate clustering 400 of a plurality of vehicles 410 on a payload 405 of a launch vehicle, according to an embodiment of the present invention. In this embodiment, the launch vehicle may include a payload 405 configured to hold any number of vehicles. For example, FIGS. 4A through 4C show that a payload 405 may include three, four, or eight vehicles 410.

It should be appreciated that any configuration and number of vehicles 410 can be placed on payload 405 of the launch vehicle. The configuration and number of vehicles 410 placed in payload 405 may depend on the type of launch vehicle used. For example, a launch vehicle such as Antares may include eight vehicles 410 in its payload 405, as shown in FIG. 4C. Athena-II, for example, may include four vehicles 410 in its payload 405. See FIG. 4B. In certain embodiments, the practical upper limit of the number of vehicles 410 operated simultaneously may be eight, and any successful debris removal campaign may perform at, least five (5) disposals per year.

In other embodiments, smaller launch vehicles, such as Pegasus and Minotaur 1, may be used when launching a single vehicle. It should be appreciated that when launching more than one vehicle, the cost to launch a smaller launch vehicle may be greater than using a larger launch vehicle that can hold a larger number of vehicles in its payload. However, using extremely large vehicles, such as Falcon 9 or Atlas V, may not be beneficial because such a launch vehicle may be too large to fully utilize for the purpose of the mission. Thus, depending on the mission requirements and the number of vehicles that are to be utilized, launch vehicles of different sizes can be used to carry out the mission of capturing targets in space.

Figure 5:
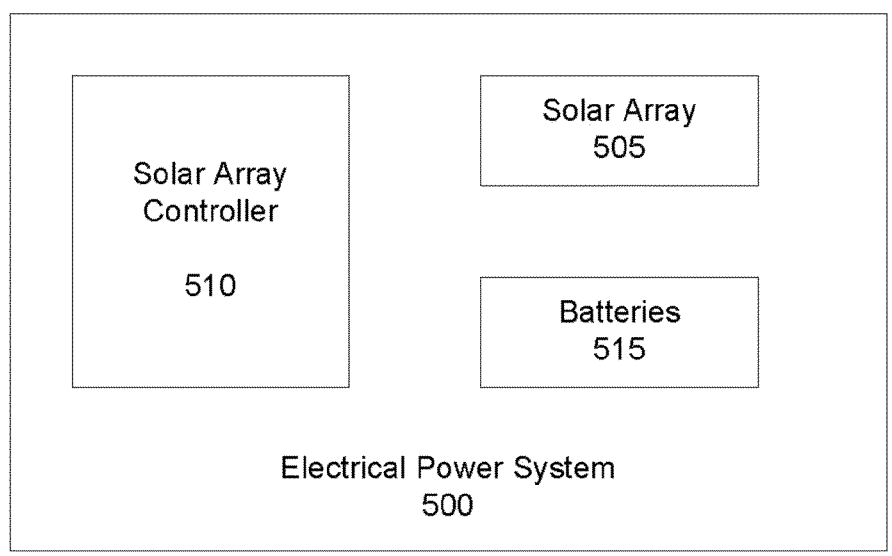
FIG. 5 illustrates a block diagram of an electrical power system of the vehicle, according to an embodiment of the present invention.

The following description related to FIGS. 5-10 details the vehicle subsystems that allow the vehicle to safely rendezvous, capture, and deorbit the target in some embodiments. FIG. 5, for example, illustrates a block diagram of an electrical power system 500 of the vehicle, according to an embodiment of the present invention. Electrical power system 500 may include a solar array 505, a solar array controller 510, and two batteries 515. Solar array 505 may be configured to capture the energy from the sunlight, while array controller 510 may control the amount of energy that is provided from solar array 505 to drive the vehicle. Batteries 515 may be configured to provide power or energy to the vehicle during the rendezvous and capture sequence, as well, as the deorbit process of the target.

It should be appreciated that electrical power system 500 may operate in three phases—(1) operations in daylight, (2) operations in darkness, and (3) operations during the debris disposal. For example, during operations in daylight, solar array 505 may fully charge batteries 515. As, shown in FIGS. 3A and 3B, the solar array may be fixed to the top of the propellant tanks and equipped with folding outboard panels, which allows for more compact packaging during the launch of the vehicle. The folding panels may return to their ascent position following deployment for orbit operations.

As mentioned above, this configuration allows solar array 505 to perform double duty as a thermal shield for the bulk of the vehicle. Batteries 515 have sufficient capacity to last through periods of orbital darkness. Moreover, prior to committing to the rate matching maneuvers and post-capture operations, batteries 515 are fully charged, solar array 505 is stowed, and the load is transferred to batteries 515 for the remainder of the mission. This is because the vehicle body rates during rate matching may potentially far exceed the ability to perform active sun tracking by the vehicle. It should be appreciated that even for a slow moving target, solar array 505 may be stowed in its launch position in order to fit the vehicle within the exhaust nozzle of the target.

Because solar array 505 is stowed during rate matching and post-capture operations, the duty cycle of the non-recharged battery may be sufficient to encompass several disposal attempts, accounting for down-modes that may be needed during disposal. If orbital conditions are not present at the time of the vehicle arrival at the target, then the vehicle will park at a safe distance on the V-bar and await the opportunities for the target to arrive prior to moving into the rate match and capture phases.

In this embodiment, batteries 515 may be sized to effectively split the stored power demands for the mission such that both batteries 515 can be used to accomplish the full mission, and a single battery 515 may be used for a shortened mission in the event of an onboard battery failure. Due to this configuration, each battery 515 may be smaller and easier to package within the generally small mid-body section of the vehicle.

Solar array controller 510, and a sun sensor (not shown), may be configured to manage the onboard power state of the vehicle, and transmit systems management signals to the guidance and control system to alter attitude for power management when not in critical mission phases. During critical mission phases, solar array controller 510 may transmit a caution and warning message when power exceeds nominals in the telemetry stream to the ground control.

Figure 6:
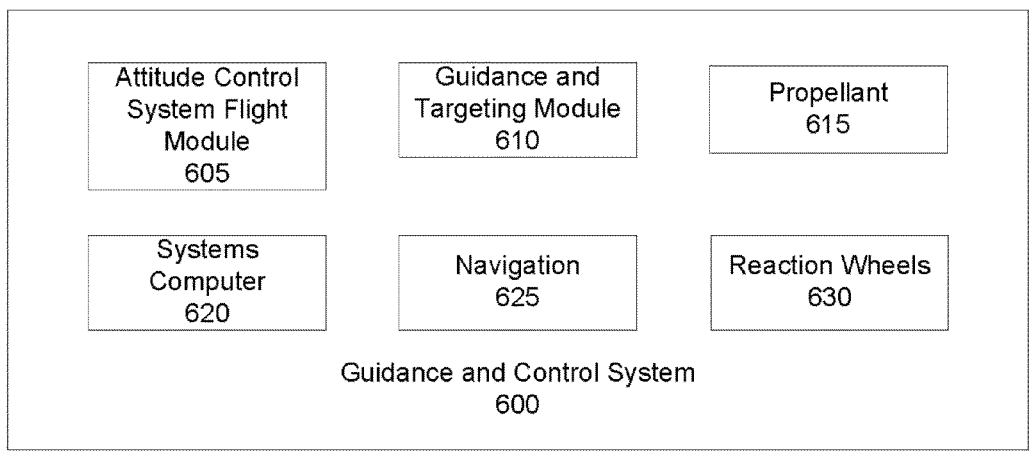
FIG. 6 illustrates a block diagram of a guidance and control system, according to an embodiment of the present invention.

FIG. 6 illustrates a block diagram of a guidance and control system 600, according to an embodiment of the present invention. Guidance and control system 600 may include an attitude control system flight module 605, guidance and targeting module 610, propellant module 615, systems computer 620, a navigation module 625, and reaction wheels 630.

Navigation module 625 may be a precisely aligned mounting point for an IMU and star tracker, and may serve as a base for attitude determination. Without the knowledge of attitude determination, the drift in the IMU and the pointing geometry to the star fields by the star tracker can generally not be obtained. A GPS unit (not shown) may be mounted to this base for convenience, but since the GPS unit is an external sensor, the GPS unit may not require the mounting precision of the IMU and star tracker. These sensors provide input for guidance and control system 600, which commands reaction wheels 630 to hold or change the attitude depending, on mission requirements.

A variety of spacecraft systemic requirements can determine the attitudes required, such as thermal conditioning, antenna, or star tracker line of sight pointing, solar tracking to charge the batteries, or gravity gradient attitudes to conserve propellant.

Guidance and control system 600 may operate during three phases (1) transit and rotation control during the loiter phase, (2) transit and rotation control during the rendezvous and proximity operations and capture phase, and (3) transit and rotation control during the disposal phase. The loiter phase may span from orbit insertion by the launch vehicle to the point at which the vehicle is approximately 12 meters from the target, at which point the proximity operation phase can be initiated. The loiter phase may last from several hours to several months, depending on the relative geometry of the vehicle insertion and target orbital planes. Although this phase may be characterized by long periods of less intensive operations, attitude control to rendezvous burn or station keeping attitudes is nevertheless critical to mission success.

Since multiple vehicles may be installed on a launch vehicle, the orientation (or attitude) of each vehicle relative to the launch vehicle is unique. Prior to launch, the attitude drift of each vehicle is monitored to help ensure launch of only fully mission capable vehicles. Shortly before separation from the launch vehicle, the attitudes may be monitored via telemetry, and updated if needed, from the launch vehicle prior to deployment of each vehicle.

Following safe separation from the launch vehicle, and in addition to the attitude requirements listed above, attitude requirements in this phase may include maneuver to burn attitudes, which minimize propellant usage and maximize communications coverage for command and telemetry purposes. Reaction wheels 630 are used, whenever possible, during this phase to minimize propellant usage.

At the point where the range to the target approaches 12 meters, the proximity operation phase begins. The DOCS sensors assess the target body rates and compare them to preflight predictions. Attitude control system flight module 605 may maintain favorable pointing geometry of the sensors to the target throughout the approach and capture sequence. Nearly simultaneously with the CARS activation during capture of the target, the attitude control system flight module 605 may issue a command for free drift to minimize loads on the vehicle while the target body rates are still present.

Once the CARS airbags have deployed and the target is secured, the attitude control system flight module may be re-enabled, but in a tail-only configuration for the reaction wheels 630. This is because the forward quads will be deeply inserted into the debris exhaust nozzle, rendering forward quads ineffective for attitude control. Onboard accelerometers can sense the primary mated tumble rates and can plan a series of reaction control system firings to assess the response of the mated stack in an effort to establish the center of gravity of the combined vehicles.

The attitude control system flight module 605 may fire jets to arrest the rates in all, axes, and bring the stack to a favorable attitude for communications and thermal protection. Secondary attitude considerations in the post-capture timeframe may include the gravity gradient torques exerted on the mated stack. During the mated loiter, prior to disposal operations, reaction wheels 630 may assume primary attitude control responsibility to conserve propellant 615, possibly augmented periodically by reaction control jets, as directed by the guidance, navigation, and control system of the vehicle.

Depending on the length of time elapsed between capture and the disposal deorbit burn, the IMU may need to be updated by maneuvering to star sweep attitude where navigation stars are visible to the star tracker on the rear of the ADRV. Attitudes during this period may also balance the thermal control and communications requirements for the mission.

The disposal phase may begin with the attitude control system flight module 605 to maneuver to the deorbit burn attitude. Throughout the burn, and for as long as control authority remains possible during entry, the vehicle may maintain positive control using its rear quads and reaction wheels. At the point where active control cannot be maintained due to increasing aerodynamic forces, the disposal mission may be considered complete.

Guidance and targeting module 610 may perform the calculations to maneuver the vehicle from the position/attitude sensed by navigation 625 to the desired attitude or location. Control system 605 may signal propellant 615 and/or reaction wheels 630 to effect the change in attitude or position of the vehicle. Systems computer 620 may perform systems management tasks.

Figure 7:
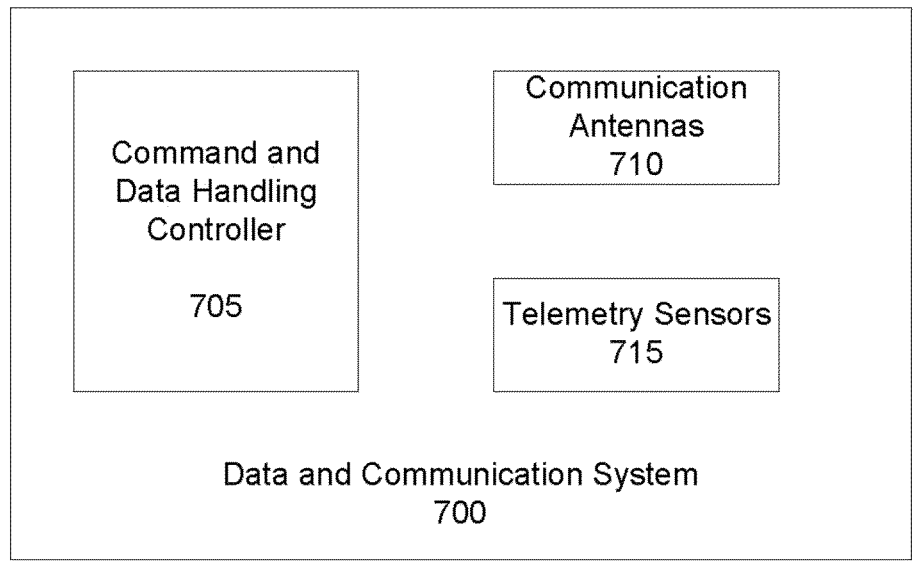
FIG. 7 illustrates a block diagram of a data and communication system, according to an embodiment of the present invention

FIG. 7 illustrates a block diagram of a data and communication system 700, according to an embodiment of the present invention. Data and communication system 700 provides all command and data handling, as well as data processing for the spacecraft bus functions. Data and communication system 700 includes a command and data handling (C&DH) controller 705, communication antennas 710, and telemetry sensors 715.

C&DH controller 705 operates during all mission phases. C&DH controller 705 provides switching logic and configures communication antennas 710 and system modes based on mission phase. Communication antennas 710 may receive commands and transit data to enable spacecraft functions.

Telemetry sensors 715 may assist the vehicle, when rendezvousing with the target, as well as entering the nozzle of the target to capture the target.

Figure 8:
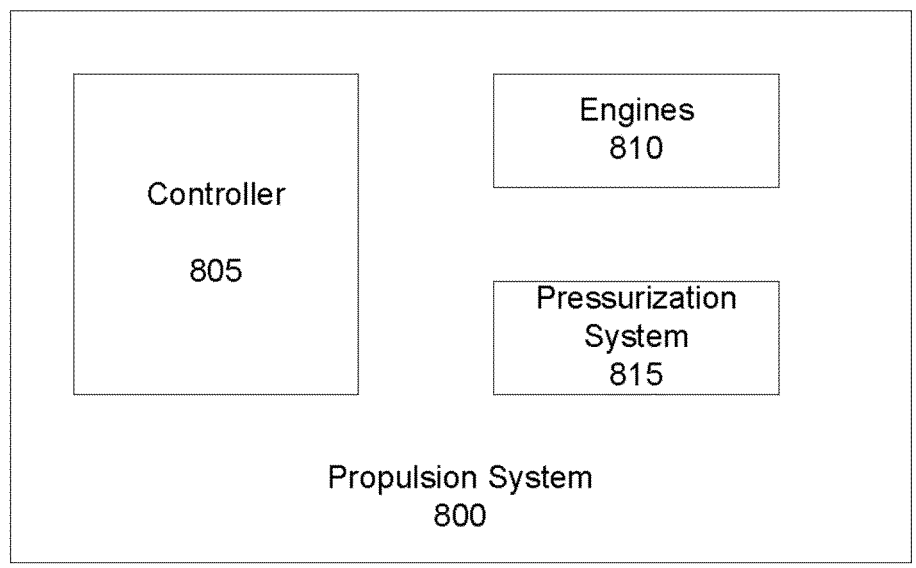
FIG. 8 illustrates a block diagram of a propulsion system, according to an embodiment of the present invention.

FIG. 8 illustrates a block diagram of a propulsion system 800, according to an embodiment of the present invention. Propulsion system 800 includes a controller 805, engines 810, and a pressurization system 815. Controller 805 may be a reaction control system and main propulsion system controller.

Propulsion system 800 includes two types of engines 810—a larger main propulsion system engine and a smaller reaction control system engine. The main propulsion system engine may be used during larger translation burns, such as orbit raising, matching rates with high tumble rate debris, and deorbit of the combined vehicle. The reaction control system engine may be used for attitude control and rate matching with the target, although the +X-axis reaction control system jets may offer a down-mode option for debris disposal to account for a failure in the main propulsion system.

In this embodiment, both system engines are bi-propellant hypergolic combustion systems, and share a common bladder-fed tank system. Pressurization system 815, with helium as the working fluid, maintains pressure within the tanks and lines feeding the main propulsion system and reaction control system engines. Two helium tanks are used in this embodiment to provide operational flexibility in feeding from one or both tanks, and to allow a leaking tank to be isolated. The helium in the remaining tank, as well as the blowdown capability of the systems, offer a level of failure tolerance to the overall system, ensuring that at a minimum, the vehicle may be deorbited so as to not contribute to the orbital debris problem.

Controller 805 may also provide insight into the pressure, volume, and temperature (PVT) of the tanks. The controller 805 may be included in the vehicle computer to facilitate communications between the elements.

Propulsion system 800 may be used during three primary mission phases: (1) during loiter phase, (2) during rendezvous and proximity operations phase, and (3) during disposal phase. During loiter phase and early rendezvous phase, the main propulsion system engine raises, the orbit from the circular orbit at which the vehicle that was deployed to a higher orbit of the target. Because each launch may include a plurality of vehicles, the insertion plane may be optimized for the cluster of targets chosen to be deorbited on that specific mission. As a result, each spacecraft may be able to raise orbit toward its target almost immediately after deployment from the launch vehicle.

The remaining vehicles, however, may wait for the nodal regression of the target orbit plane to intersect with its own plane. Since the planar capture and orbit raising burns are simultaneously performed to conserve propellant, the timing of the burns is critical to ensure that the geometry is optimized. This may also be the case for remaining rendezvous, burns.

During the proximity operations phase, the vehicle transitions from being parked on the v-bar for assessment of the target to maneuvering into the plane of rotation of the target so that rate matching and capture sequence can be performed. Early in this sequence, and particularly for targets with higher tumble rates, the radial acceleration needed for maintaining the vehicle in a decreasing radius orbit about the target may exceed the ability of the reaction control system jets. However, pulsing the main propulsion system engine may solve this problem.

It should be appreciated that the spacecraft computer may establish an optimum approach plan based on the characteristics of the target and available propellant, which blends, the function of the main propulsion system engine and the reaction control system engine to safely capture the target in a minimum time frame without over-controlling the vehicle. When the capture and release system primary capture latch fires, propulsion system 800 is taken to a free drift mode to minimize loads transferred through the mast of the capture and release system back into the vehicle.

Following the capture and de-spin phase, the main propulsion system engine can be fired again to lower the target perigee in preparation for disposal, and also to assess the reaction control system engine consumption needed to maintain control for a potentially offset center of gravity of the combined vehicle during the burn. This data may be used by ground control to create the disposal plan, which may also be performed nominally by the main propulsion system engine with down-mode to the +X-axis reaction control system if needed. Timing for the perigee adjust and deorbit burns may be accounted for because the vehicle may be on internal battery power, and the disposal plan may account for both prime and backup deorbit burns and steep (main propulsion system) or shallow (reaction control system) deorbit trajectories.

Figure 9:
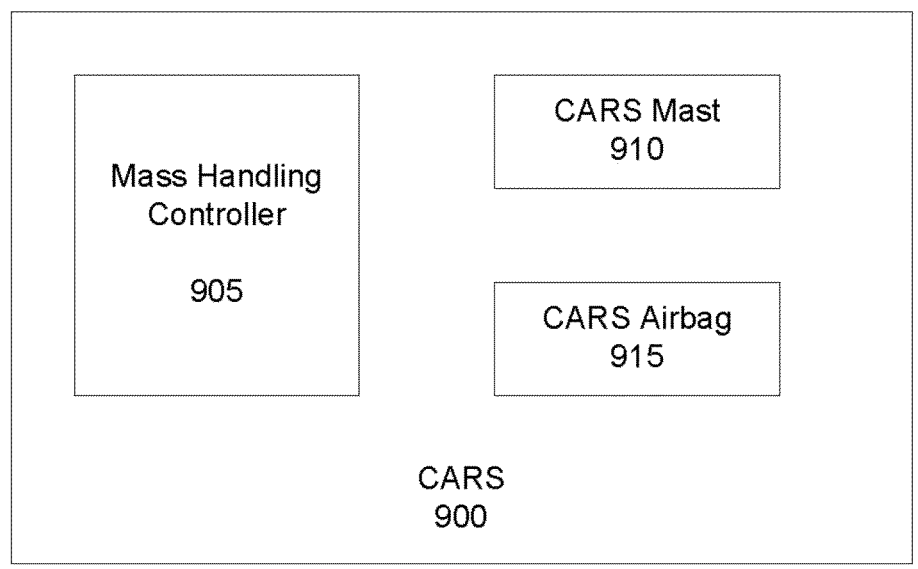
FIG. 9 illustrates a block diagram of a capture and release system (CARS), according to an embodiment of the present invention.

FIG. 9 illustrates a block diagram of a CARS 900, according to an embodiment of the present invention. CARS 900 may include a mass handling controller 905, a mast 910, and an airbag 915. In one or more embodiments, CARS 900 may physically interact with the target. In one embodiment, the SCS computer may interface with CARS 900 to provide a command and status as part of the mission data handling task. However, unlike the remote sensing aspects of target characterization described below, CARS 900 focuses on mass handling of the target.

CARS 900 may provide data pertaining to the proximity between the target nozzle and the capture snare, the state of the principal elements of CARS 900, mast 910 and airbags 915, and a positive confirmation of a capture signal back to the SCS computer. Mast 910 may include a plurality of segments that allow mast 910 to be extended into the combustion chamber of the target. Mast 910, a telescoping boom extended from the front centerline of the vehicle and equipped with an inflatable capture snare at the end, allows for a single CARS to be designed for several different types of exhaust nozzles by changing the deployed length of mast 910.

This may be accomplished by extending mast 910 to a known length, appropriate for the target that is to be retrieved. Mast 910 may extend by tapping the helium pressurization system included in the propellant system. Mast 910 can be retracted by decreasing its internal, regulated pressure and rewinding a cable attached to the final segment on one end and a motorized reel on the other, and pulling each segment back toward the stowed position.

Similarly, airbag 915 uses helium for inflation purposes, which is intended to conform to the interior of the debris target exhaust nozzle and draw the capture snare tightly into the nozzle throat—thereby centering the vehicle in the nozzle and forming a rigid structural mating between the two vehicles. The hard-mated position may be realized when the drive motor current in the retraction reel and internal airbag pressures reach expected levels corresponding to a hard dock.

It should be appreciated that CARS 900 may operate under the following mission phases: (1) loiter phase, (2) proximity operation and capture phase, and (3) disposal phase. During loiter phase, the CARS 900 may be monitored to ensure its function prior to committing to orbit raising maneuvers. During rendezvous with the target, the state of CARS 900 is monitored and mast 910 is extended in preparation for the capture phase. During the proximity operation and capture phase, the vehicle rates are matched with the target such that mast 910 can enter the nozzle of the target. As the snare passes, the throat of the nozzle, the snare may inflate and expand to ensure that the snare cannot back out of the nozzle.

As the vehicle enters the nozzle, small variations in relative motion or alignment may cause the front of the vehicle to contact the interior of the nozzle sidewall. However, as discussed above, the cowcatcher will protect the front of the vehicle from such impact. Additionally, small rollers shown in FIG. 3C are fitted around the edges of the cowcatcher to facilitate the rolling of the vehicle along the edge of the nozzle interior as mast 910 engages the throat of the nozzle. At this point, the snare may have captured the throat, and upon confirmation that the snare has opened, the SCS computer may command the vehicle to switch to a free drift mode to minimize loads.

Next, airbags 915 may be inflated and mast 910 may be retracted to draw the combined assembly tightly into a hard dock configuration. Since the tumble of the target may not have been damped out, mast 910 may react to tension due to centripetal acceleration of the tumbling debris, and therefore, the rates may be damped out as soon as operationally practical. When the rates are damped out, the capture phase is complete.

The disposal, phase involves maneuvering the combined vehicle to the deorbit burn attitude. Once the burn has been initiated, the loads in CARS 900 may be in compression, therefore both the tension of mast 910 and internal pressure of airbags 915 may be monitored to ensure that the combined vehicle remains tightly secured throughout disposal. It should be appreciated that both inflation pressure and extension length can be adjusted if necessary for safety.

In this embodiment, CARS 900 may release the debris object. For example, when a system failure to the vehicle renders it incapable of deorbiting the target, but a self-deorbit may remain a possibility. In this instance, a propellant or pressurization system leak or battery failure may cause a system failure. To release the debris object, the snares and mast 910 may be retracted and airbags 915 may be deflated.

Figure 10:
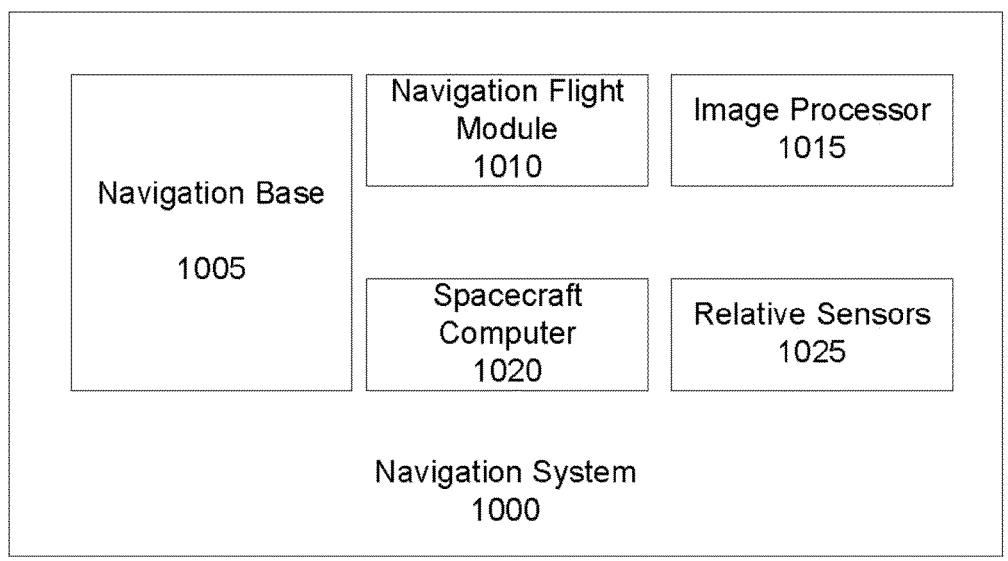
FIG. 10 illustrates a block diagram of navigation system, according to an embodiment of the present, invention.

FIG. 10 illustrates a block diagram of navigation system 1000, according to an embodiment of the present invention. Navigation system 1000 includes a navigation base 1005 that may include an IMU, GPS unit, star tracker, etc. Navigation system 1000 may also include navigation flight module 1010, an image processor 1015, spacecraft computer 1020, and relative sensors 1025.

Navigation flight module 1010 may navigate, or provide guidance to maneuver, the vehicle from one location to another location. Image processor 1015 may be used to incorporate sensor data to navigation flight module 1010. Spacecraft computer 1020 may control the vehicle during rendezvous and capture of the target. Relative sensors 1025 may be configured to capture relative motion data of the target. The navigation base is formed by the IMU and star tracker, but is also updated by GPS comparison of the vehicle ephemeris and measured navigation base errors.

It should be appreciated that navigation system 1000 may include some of the components from the SCS and DOCS. Spacecraft computer 1020 is separate from the ADRV processor due to its high computational requirements and the relatively short duration of principal regard. This component may translate the state information collected from the sensors 1025 into commands implemented by the guidance, navigation, and control system. In addition to the inertial sensors, spacecraft computer 1020 interacts with the characterization sensors (e.g., noise radars, visible and infrared (IR) cameras) and the CARS controller. It should be appreciated that the SCS indirectly issues, guidance, navigation, and control commands for translation and rotational maneuvers to the vehicle computer. The ADRV computer may then communicate directly with the effectors.

The debris characterization sensors may include visual sensors and non-visual sensors. The visual sensors include low light visual and infrared video cameras. The video camera is further equipped with a radio frequency transmitter that allows the system to transmit live video from the spacecraft to the ground control when acceptable ground coverage exists. The sensors may include optical feature recognition and noise radar sensors.

The debris characterization sensors may be tightly coupled with software modules running in the spacecraft computer 1020. More specifically, image and pattern recognition modules running as part of the SCS tool suite may be fused with image data fed from the cameras to help assess the target plane of rotation and tumble, period. Similarly, range, range rate, and bearing data from the characterization sensors may feed the trajectory planner included in the terminal phase guidance so that a converged burn sequence can be achieved.

Simultaneous to the trajectory planning, spacecraft computer 1020 may perform a timeline planning function. For example, a priori knowledge of the rotational state, of the target computed from ground tracking may be used to define the starting position for the proximity operations. This may relay to the mission manager the timing of the upcoming events so that they can enforce mission constraints (e.g., favorable lighting and antenna coverage to TDRS and/or ground stations).

The target characterization role is time-dependent on which mission phase the vehicle is presently engaged in. The various sensing phases could be described as during rendezvous, during proximity operations and capture, and during the post-capture timeframe, with target range as the independent variable to determine the optimum sensor for a particular task. Beyond a range of approximately 100 km to the target, the guidance, navigation and control (GN&C) sensing tasks may be conventional with other rendezvous operations, i.e. star trackers, IMU, and GPS sensors included as, part of the core spacecraft functions are generally dominant.

The first mission sensor applied to the rendezvous is the IR camera. With an expected effective range of at least 100 km, this sensor provides bearing data and offers sufficient resolution to functionally backup the star tracker. The IR camera may be augmented by the visible light camera intermittently at a range of 15 km, but more continuously at a range of 1 km for target bearing. Also at a range of approximately 1 km, the LIDAR, sensor if incorporated may become an effective means for both range and bearing.

At a range of 100 m from the target, the phase changes from rendezvous to proximity operations and capture. This is critical because it marks the changeover from travelling to the target to actually capturing the target. As range is slowly decreased from 100 m to 8-12 m, the tumble attitude, plane, center of rotation, and period of rotation may be added to the range, range rate, and bearing that were all previously collected. At 8-12 m, the vehicle parks itself on the V-bar and performs its final assessment using all, of the above sensors, including the addition of the noise radar to fully characterize the target motion, the overall target state, and the planning of the burn sequence to capture the target. A portion of the planning involves the timeline post capture to the next series of available deorbit opportunities.

This may be important for several reasons. First, it is wise to have more than one consecutive deorbit opportunity in order to protect for an underburn or reaction control system deorbit. Secondly, prior to initiating the capture sequence, sufficient battery life is required so that the solar array can be retracted and bypassed. The solar array may not be effective once enclosed within the nozzle of the target. Similarly, orbital lighting and favorable coverage over ground stations are timeline considerations that the mission planner function will consider before sending the plan to the mission manager.

It should be appreciated that ground control may also be able to monitor the mission execution by the vehicle in parallel. This, may allow ground control to halt any mission if, for example, a system failure is detected or the nozzle of the target is not approachable.

Once the target has been characterized by the sensors, a comparison can be made to the computed trajectory and burn plan to a preflight prediction. When the timeline conditions are satisfied, spacecraft computer 1020 may command the spiral capture sequence. The execution of these maneuvers may be performed in two phases. First, the vehicle can maneuver into the capture the plane of tumbling rotation of the target. Once this maneuver has been verified, the vehicle can accelerate to match the rotation rate of the target.

Once the target is captured, the post-capture phase, i.e., the second phase, commences. In this phase, the vehicle can re-enable attitude control and begin a series of characterization burns using the rear reaction control system thrusters. These burns assess the response of the combined vehicle to known impulse events, allowing the SCS to estimate the mass properties of the combined vehicle for a stable de-orbit burn. The sensors available to the guidance system in this timeframe are the IMU and accelerometers, although the GPS antenna and star tracker on the rear of the vehicle remain viable for orbital navigation.

The characterization system may also be used during deorbit, when spacecraft computer 1020 functions as a backup to the vehicle computer for targeting the deorbit maneuvers. This allows for disposal to continue in the event of a software module malfunction in the vehicle computer.

Figure 11:
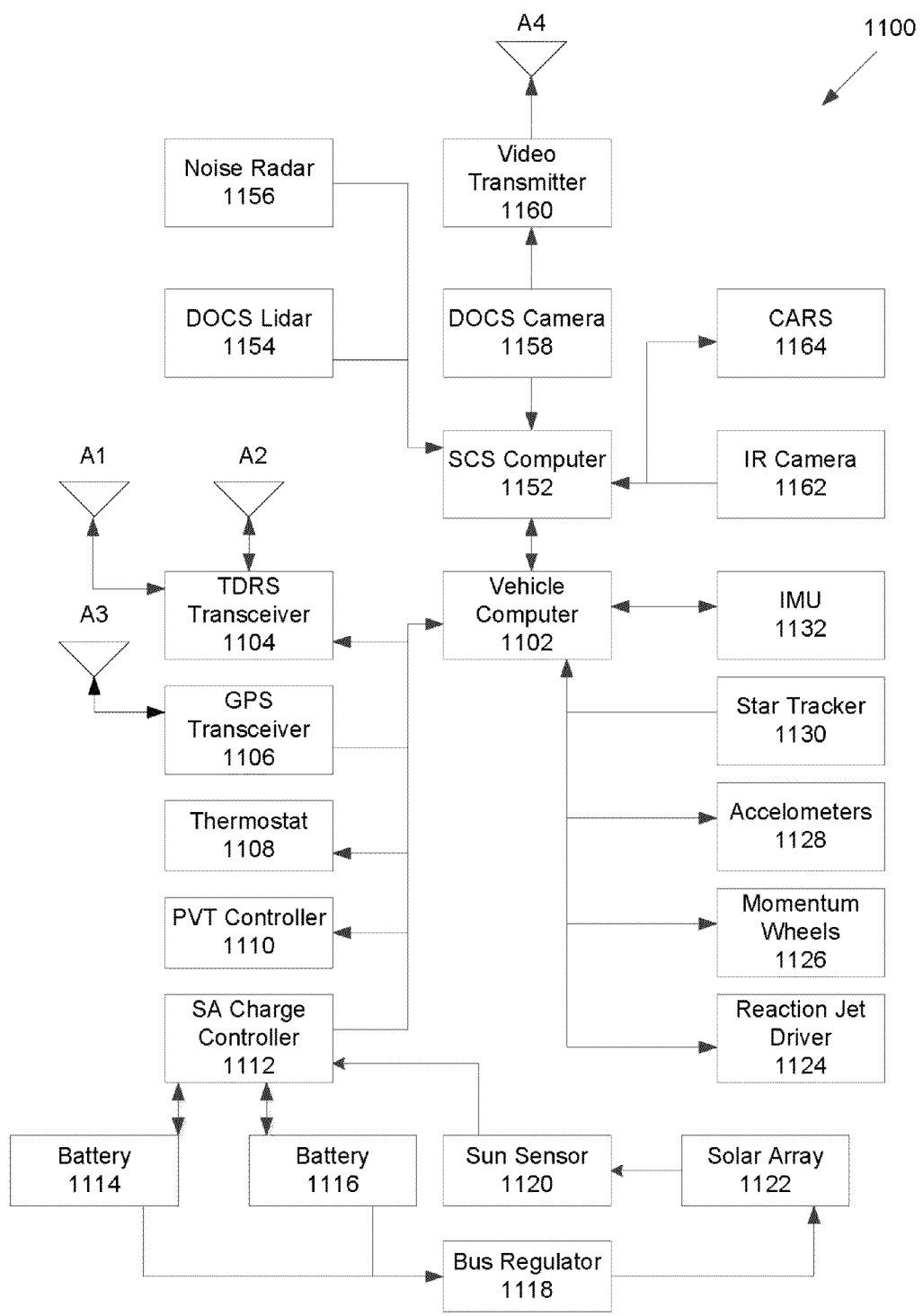
FIG. 11 illustrates a block diagram of subsystem components of ADRV, according to an embodiment of the present invention.

FIG. 11 illustrations a block diagram 1100 of the subsystem components of the ADRV, according to an embodiment of the present invention. The vehicle data processing and command and data handling duties can be functionally split between mission data handling and spacecraft systems data handling. This split differentiates the functions for the debris mission (mission data handling) and the functions for routine duties for spacecraft systems. This split allows the bulk of the spacecraft bus to be constructed from commercial line replacement units, simplifying the design, development, test, and evaluation of the overall system and contributing to simplified long-term vehicle production.

Components core to the routine duties of the vehicle include, but are not limited to, vehicle computer 1102, a tracking and data relay satellite (TDRS) transceiver 1104, global positioning system receiver 1106, thermostat 1108, propellant pressure, volume, and temperature (PVT) controller 1110, solar array (SA) charge controller 1112, batteries 1114, 1116, spacecraft bus regulator 1118, sun sensor 1120, solar array 1122, reaction jet driver 1124, momentum wheels 1126, accelerometers 1128, star tracker 1130, and IMU 1132. Components indigenous to the debris mission include, but are not limited to spacecraft control (SCS) computer 1152, DOCS LIDAR 1154, noise radar 1156, DOCS camera 1158, an, ultra-high frequency video transmitter 1160, infrared camera 1162, and CARS 1164.

For the routine duties of the vehicle, spacecraft bus regulator 1118 is configured to regulate voltage to the solar array 1122. For example, SA charge controller 1112 may activate solar array 1122 when sun sensor 1120 detects sunlight. This allows the vehicle to conserve the energy stored in batteries 1114, 1116, and rely mostly on solar power. The power collected from solar array 1122 can be used by SA charge controller 1112 to drive vehicle computer 1102, as well as other components on the vehicle.

Vehicle computer 1102 may be a central processor and an interface between other vehicle components and ground control (not shown). Vehicle computer 1102 may include a master timing source for the vehicle, and may be configured to assemble and route telemetry data. Vehicle computer 1102 may also provide memory for data and video storage prior to downlink, and issue commands generated either from its own system software module, spacecraft control system computer 1152, or received from ground control.

Vehicle computer 1102 may also control heater cycling using thermostat 1108, and perform propellant PVT management using PVT controller 1110. Vehicle computer 1102 may further control the charge and discharge rates on the electrical power bus via SA charge controller 1112. Vehicle computer 1102 further performs guidance and control functions by assimilating data from star tracker 1130, GPS receiver 1106, and IMU 1132. Vehicle computer 1102 may also perform basic trajectory planning functions in certain embodiments.

The processor of vehicle computer 1102 communicates through a TDRS network via TDRS transceiver 1104 and two hemispherical antennas $A_1$, $A_2$ located on a compartment at the rear of the vehicle. See FIG. 3A, structure 306. TDRS transceiver 1104 may be a S-band transceiver, or any transceiver that would be readily appreciated by a person of ordinary skill in the art. GPS receiver 1106 and associated antenna $A_3$ are also located in this compartment.

The avionics components, such as TDRS transceivers 1104, antennas $A_1$, $A_2$, GPS receiver 1106, and antenna. $A_3$, may be mounted to the flat panel sections of the compartment at the rear of the vehicle. The avionic components may also function as radiators to provide conductive cooling to the electronics within the rear compartment of the vehicle. Telemetry sensors may be attached at strategic locations throughout the spacecraft, and are connected to vehicle computer 1102.

During launch, deploy, and loiter phases, vehicle computer 1102 provides the primary command and control for the vehicle. Logic may be included in, the modules of vehicle computer 1102 to appropriately configure the vehicle in the event of a serious anomaly so that failures are not propagated throughout the vehicle. This may allow ground control with sufficient time to troubleshoot any problem.

During the rendezvous and proximity operations phases of the mission, SCS computer 1152 may control the command and data handling of the SCS. SCS computer 1152, which is connected to ADRV computer 1102 and all of the debris mission sensors, assumes primary command and data handling authority for the mission during the proximity operations and capture phase. SCS computer 1152 may be used during the critical capture and initial mass handling phase. During this phase, vehicle computer 1102 may continue its normal systems management functions, and with the capacity to abort the capture sequence if the health of the vehicle is shown to be out of limits.

It should be noted that a smaller function of, the guidance and control system may also be running, transmitting state information to SCS computer 1152. The guidance and control system may also issue guidance and control commands that originate from SCS computer 1152. Ground control may assess the mission conditions and determine when to switch to full command and data handling mode. Once the target has been captured, SCS computer 1152 may be powered off to save electrical power. However, in the event of a failure in vehicle computer 1102, SCS computer 1152 may be activated.

It should be appreciated that in certain embodiments that SCS computer 1152 may remain activated as a backup to vehicle computer 1102 during the deorbit sequence. This maximizes the likelihood of a successful target deorbit on the desired trajectory. Vehicle computer 1102 retains primary command and data handling responsibility throughout this phase. SCS computer 1152 reviews, and propagates its own guidance solutions, but does not issue commands except in response to a failure of vehicle computer 1102.

If SCS computer 1152 fails to receive a signal from vehicle computer 1102 over a predefined period of time, SCS computer 1152 may take control from vehicle computer 1102. At this point, vehicle computer 1102 is switched to a standby mode. It should be appreciated that control may be transferred back to vehicle computer 1102 in some embodiments.

Figure 12:
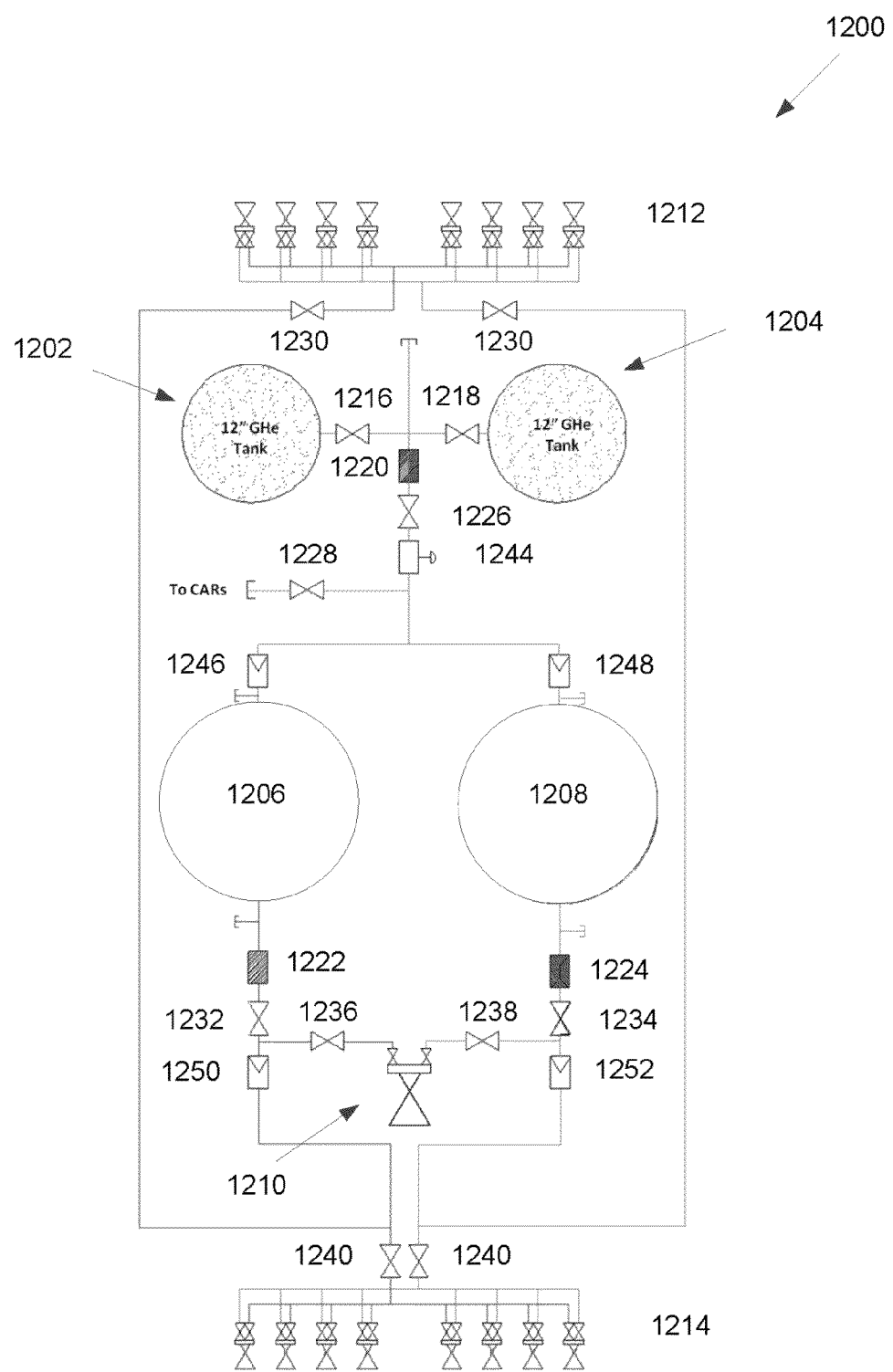
FIG. 12 illustrates a propulsion system, according to an embodiment of the present invention.

FIG. 12 illustrates a propulsion system 1200, according to an embodiment of the present invention. Propulsion system 1200 utilizes a bi-propellant system that uses hypergolic propellants and a regulated pressurant gas supply system. It should be appreciated, however, that other propulsion systems may be used depending on the configuration of the vehicle.

In this embodiment, propulsion system 1200 includes two helium tanks 1202, 1204. Helium tanks 1202, 1204 may have a diameter of approximately 12 inches and may be pressurized at approximately 4,000 pounds per square inch (PSI). Propulsion system 1200 may also include an oxidizer tank 1206 and a fuel tank 1208.

Propulsion system 1200 also includes a main engine 1210 configured to perform large translational maneuvers and front and rear thrusters 1212, 1214 configured to perform attitude control and fine translation functions. Both main propulsion engine 1210 and front, and rear thrusters 1212, 1214 feed from the same oxidizer and gas tanks 1206, 1208 via a common manifold to achieve a simple lightweight vehicle.

Propulsion system 1200 may further include gaseous helium (GHe) valves 1216, 1218, filters 1220, 1222, 1224, pressure valves 1226, 1228, front reaction control system valves 1230, rear reaction control system valves 1240, tank valves 1232, 1234, main engine valves 1236, 1238, pressure regulator 1244 at approximately 350 psi, and a plurality of check valves 1246, 1248, 1250, 1252.

GHe valve 1228 and pressure regulator 1244 may control the amount of pressurized helium that flows to CARS. GHe valves (e.g., pressure valves) 1216, 1218 may further control the amount of pressurized helium that flows to oxidizer tank 1206 and fuel tank 1208 to drive main engine 1210 and front and rear thrusters 1212, 1214. Tank valve 1232 and main engine valve 1236 control the amount of oxygen that flows to the chamber of main engine 1210. Tank valve 1234 and main engine valve 1238 perform similar functions. Tank valves 1232, 1234, as well as front valves 1230 and rear valves 1240, control the amount of oxidizer and fuel flowing to the front and rear thrusters 1212, 1214.

Filters 1220, 1222, and 1224 prevent contaminants from moving through the system and jamming valves, front and rear thrusters 1212, 1214, and main propulsion engine 1210. Check valves 1246, 1248, 1250, and 1252 maintain flow in the desired direction so that oxidizer and fuel do not mix before being introduced simultaneously to the combustion chambers.

Figure 13:
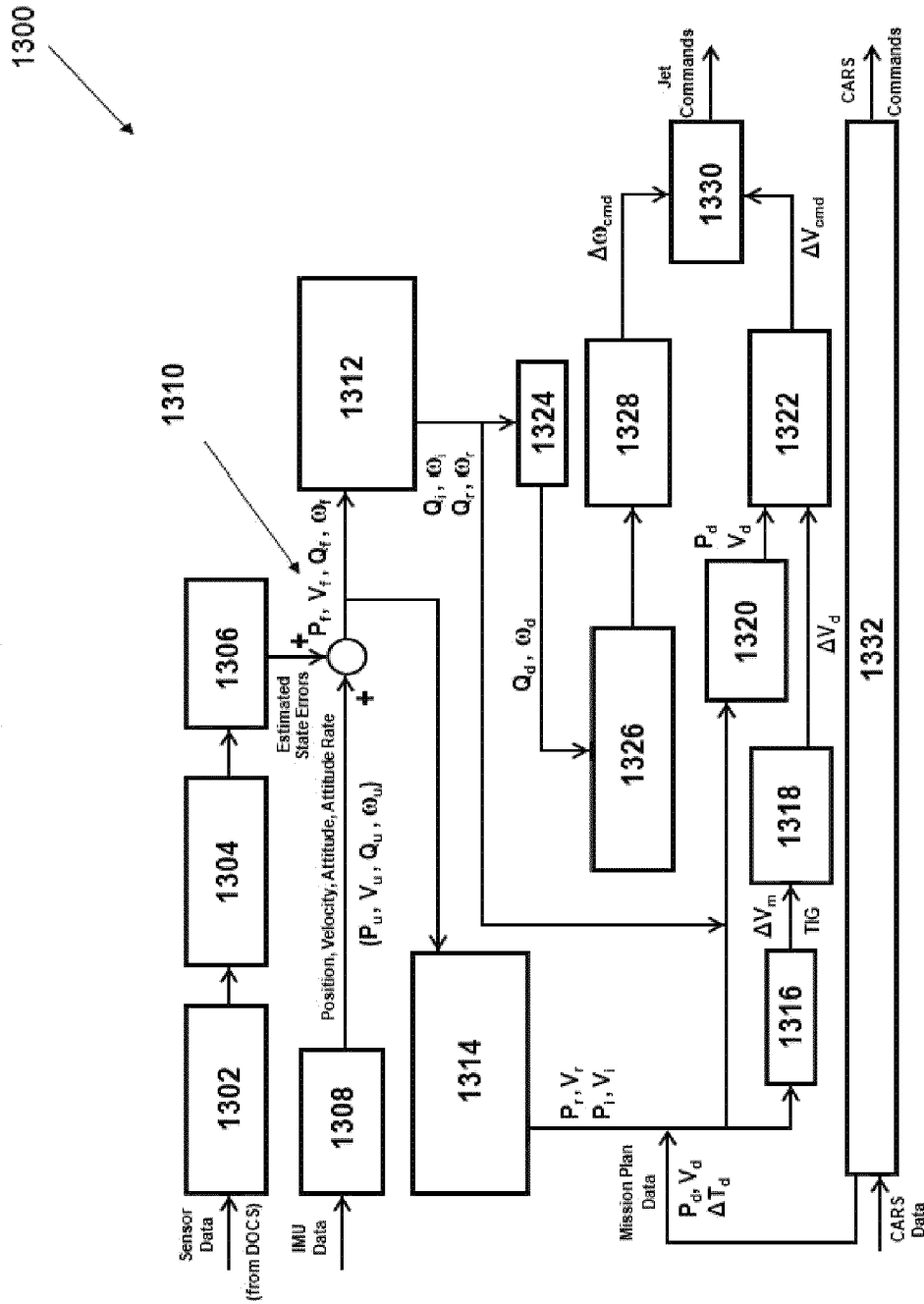
FIG. 13 illustrates a logic flow of the guidance and control system, according to an embodiment of the present invention.

FIG. 13 illustrates a logic flow 1300 of the guidance and control system, according to an embodiment of the present invention. During proximity operations, capture and de-orbit, the SCS processor can be used as the primary onboard command authority for the mission. During quiescent and loiter phases, the ADRV processor is responsible for control and data handling.

At 1302, the SCS processor performs measurement processing of sensor data that is received from DOCS. Measurement processing includes processing relative sensor data in preparation for filtering. At 1304, the SCS processor performs measurement editing. Measurement editing includes identifying suspect sensor data by comparing against a prediction. At 1306, the SCS processor performs error state filtering. Error state filtering includes estimating the errors in the navigation state and generating an estimate of state error.

It should be noted that in addition to receiving the sensor data from DOCS, the SCS processor receives IMU data and performs a state update at 1308. The state update includes an update to the navigation state (both propagated and filtered using the IMU). IMU state update may include position P, velocity V, attitude Q, and attitude rate $\omega$.

The estimated state errors and the updated IMU state are combined at 1310 to generate a filtered position $P_f$, velocity $V_f$, attitude $Q_f$, and attitude rate $\omega_f$. At 1312, the SCS processor performs rotational state processing and filtering on the combination of the estimated state errors and the updated IMU state to generate inertial quaternion $Q_i$ and angular $\omega_i$, as well as relative quaternion $Q_r$ and angular $\omega_r$. This may include calculating the attitude and attitude rates for guidance and control, as well as transform data into required frames, and filter out undesired structural dynamics.

At 1314, the SCS processor also performs translational state processing and filtering on the combination of the estimated state errors and the updated IMU state to generate relative position $P_r$ and velocity $V_r$, as well as inertial position $P_i$ and velocity $V_i$. This may include calculating a position and velocity for guidance and control, as well as, transforming data into required frames and filtering out undesired structural dynamics. The result at 1314 may be combined with the mission data plan received from mission manager. The mission data plan may include position desired $P_d$, velocity desired $V_d$, and time desired $T_d$.

At 1316, the combination of the mission data plan and the translational state are used to compute delta velocities (mission) $\Delta V_m$ required for orbit change. A burn guidance is utilized at 1318 to assist control during burn execution by updating required delta velocities (desired) $\Delta V_d$.

At 1320, the rotational state, along with the combination of the translational state and mission data, are used to calculate the desired velocity $V_d$, maneuver times, and desired position $P_d$ and velocity during the proximity operations and capture. Using the calculated delta-velocities, maneuver times, and required position and velocity during the proximity operations and capture, along with the updated delta velocities from burn guidance, a translation control law is utilized at 1322 to calculate the translational rate change commands $\Delta V_{cmd}$ for jet selection.

At 1324, the rotational state from the rotational state processing and filtering discussed above is used to calculate the required attitude and attitude rate based on a desired attitude specification (e.g., pointing). This result (desired quaternion $Q_d$ and desired angular rate $\omega_d$) is used to execute attitude maneuver logic at 1326, such that command attitude and attitude rate for control laws are calculated. The calculated command attitude and attitude rate are used at 1328 to calculate rotational rate change commands $\Delta\omega_{cmd}$ for jet selection.

At 1330, the rotational rate change commands and the translational rate change commands are used for the reaction control system jet selection. The mission manager may transmit commands at 1332 using the data from CARS.

Figure 14:
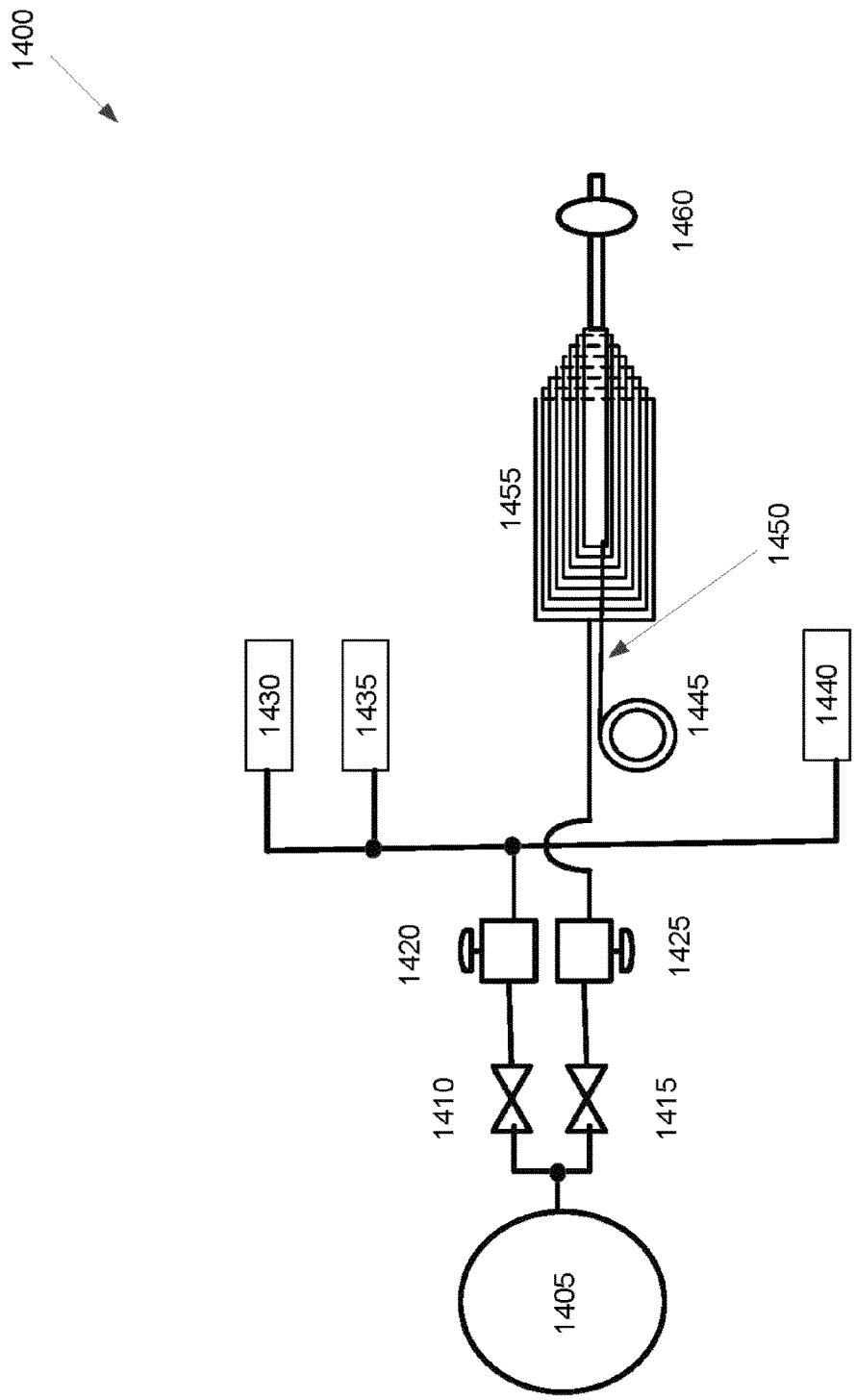
FIG. 14 illustrates a schematic of a capture and release system (CARS), according to an embodiment of the present invention.

FIG. 14 illustrates a schematic of CARS 1400, according to an embodiment of the present invention. CARS 1400 may include a helium tank 1405 operably connected to an airbag valve regulator 1410 and CARS valve regulator 1415. Helium tank 1405 may include sufficient amounts of pressurized helium to inflate each airbag 1430, 1435, 1440, extend mast 1455, and to inflate snare 1460.

In this embodiment, airbag valve regulator 1410 regulates the pressure from helium tank 1405 in order for the helium to inflate each of the plurality of airbags 1430, 1435, 1440. CARS valve regulator 1415 regulates the pressure in order for the helium to extend mast 1455 and inflate snare 1460.

Mast 1455 may extend outward when connecting with, or entering, the nozzle of the target. Mast 1455 includes a cable 1450 that is connected between the end of mast 1455 and a motorized reel 1445. Cable 1450 allows mast 1455 to be retracted after the target has been captured to draw the nozzle of the target tightly against airbags 1430, 1435, 1440.

Snare 1460 includes a capture bag (not shown) and a capture valve (also not shown). The capture valve may be near the capture bag and may be used to regulate the pressurized helium, such that snare 1460 can be inflated. In the event that snare 1460 cannot be inflated, a secondary mechanism, such as a carbon dioxide cartridge, may be used to inflate snare 1460.

Regulators 1420 and 1425 may control the amount of pressure allowed downstream of the helium tanks, and independently, into the CARS systems.

It should be appreciated that the tip of mast 1455 includes a plurality of rollers (not shown). The plurality of rollers may guide mast 1455 through the nozzle and into the combustion chamber of the target.

Figure 15:
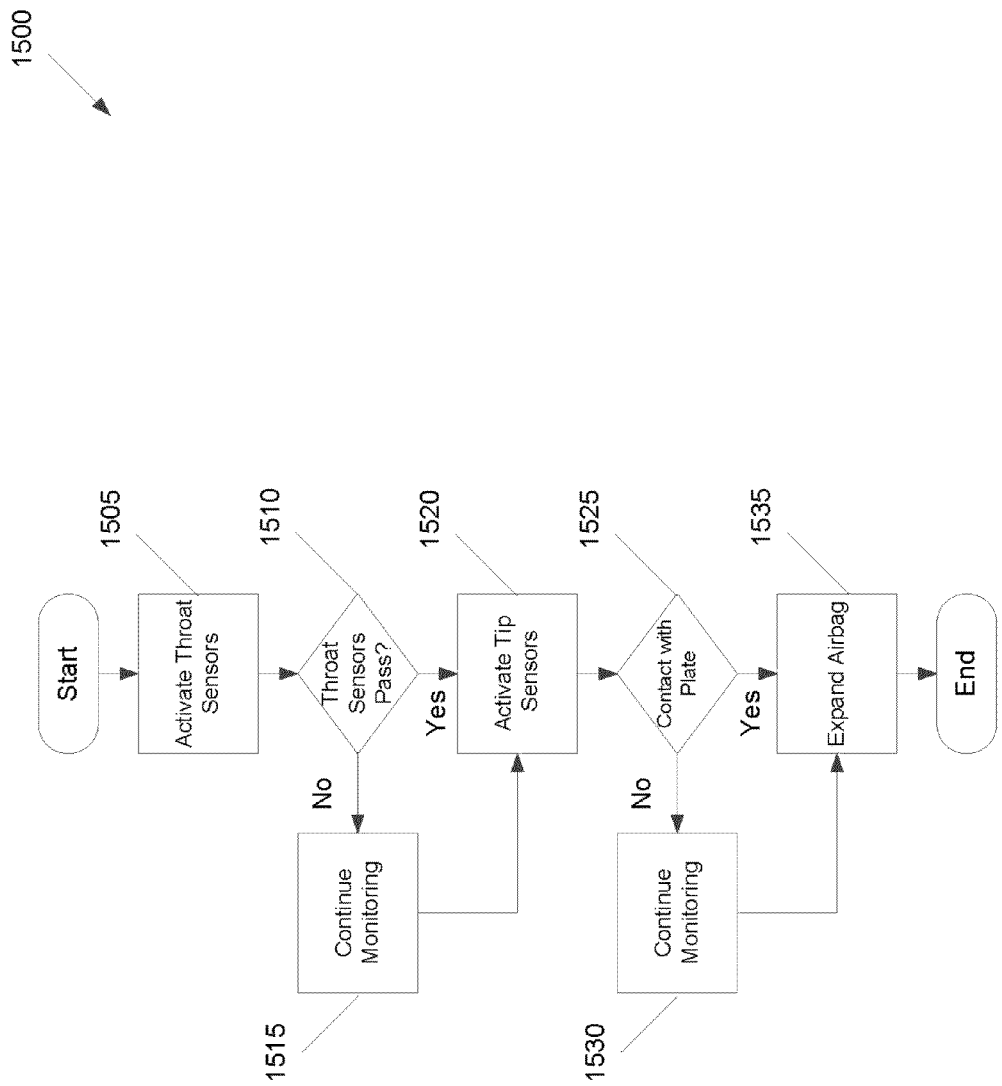
FIG. 15 illustrates a process for inflating a capture airbag of the mast, according to an embodiment of the present invention

FIG. 15 illustrates, a process 1500 for inflating a capture airbag of the mast, according to an embodiment of the present invention. While this embodiment includes three throat sensors and three tip sensors, other embodiments may include more or less than three throat sensors and three tip sensors.

At 1505, when the mast of the ADRV enters the nozzle, the throat sensors are activated. At 1510, CARS determines whether the throat sensors have all passed through the throat of the nozzle. If not, then CARS continues to monitor the remaining throat sensors until each of the throat sensors have passed through the throat of the nozzle at 1515.

If the throat sensors have passed through the nozzle, then at 1520. CARS is configured to activate the tip sensors. At 1525, CARS determines whether each tip sensor is in contact with the injector plate or comparable structure of the combustion chamber. If not then CARS continues to monitor the remaining tip sensors until each of the tip sensors press against the injector plate in the combustion chamber at 1530. At 1535, if all of the tip sensors are firmly pressed against the injector plate, then CARS may cause the airbag in the snare to expand to secure the vehicle with the target.

Figure 16:
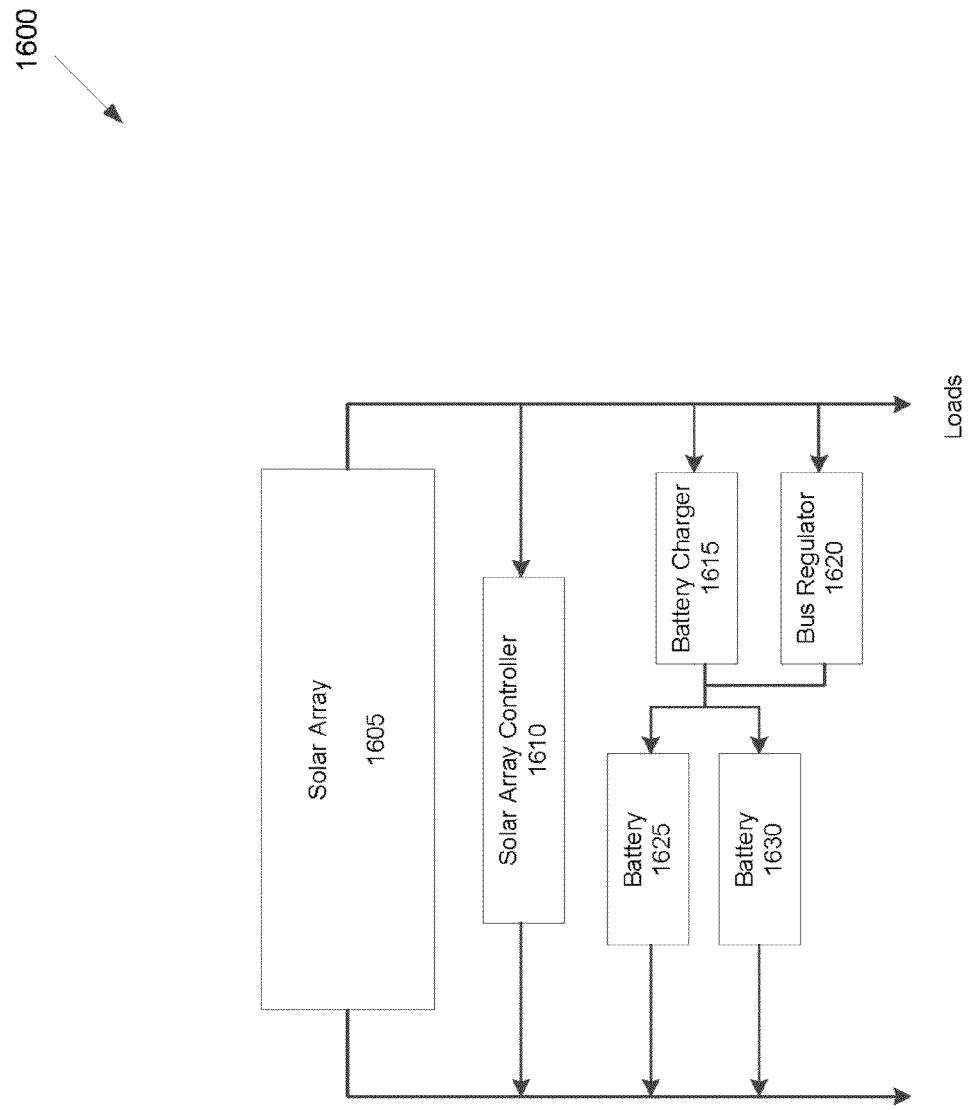
FIG. 16 illustrates a schematic of a power system, according to an embodiment of the present invention.

FIG. 16 illustrates a schematic of power system 1600, according to an embodiment of the present invention. Power system 1600 may include a direct energy transfer (DET), fully regulated system. Power system 1600 may have low power demands due to the modest mission length and high degree of bus power sensitivity that may exist for the multiple processors and sensors on the bus of the vehicle.

In this embodiment, solar array 1605 may collect energy during sunlight or prior to rendezvousing with the target. The energy provided from solar array 1605 may be regulated by solar array controller 1610. It should also be appreciated that solar array controller 1610 may receive power from the energy collected by solar array 1605. It should be noted that solar array controller 1610 may regulate battery charging current on the front end, with excess power transmitted to shunt resistors (not, shown).

Battery charger 1615 may also receive energy collected by solar array 1605 and provide energy to batteries 1625, 1630. The energy provided to batteries 1625, 1630 may be regulated by bus regulator 1620. It should be appreciated that bus regulator 1620 may maintain constant utility voltage during discharge of batteries 1625, 1630.

Figure 17:
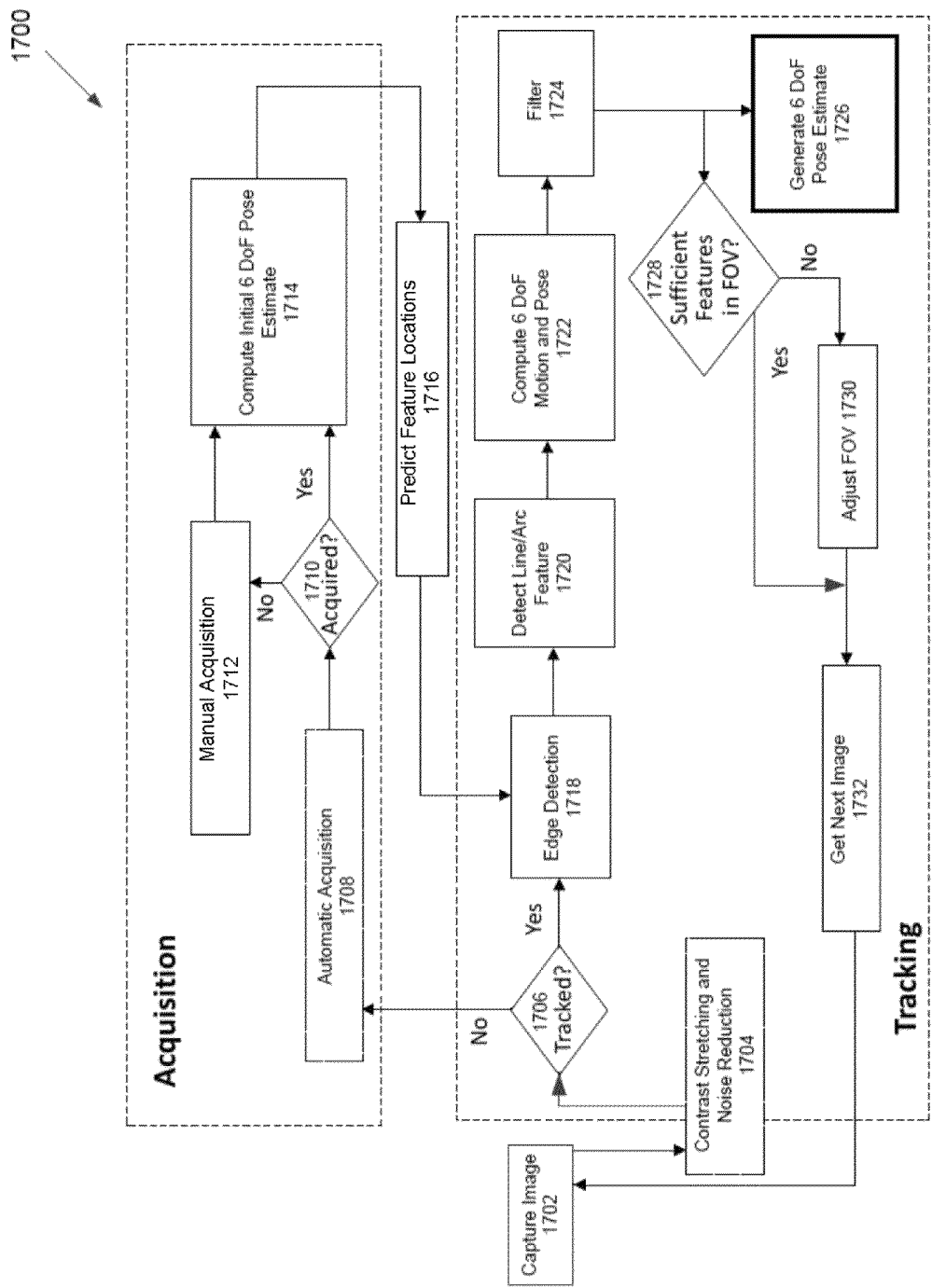
FIG. 17 illustrates a logic flow for a natural feature image recognition (NFIR) process, according to an embodiment of the present invention.

FIG. 17 illustrates a logic flow for a natural feature image recognition (NFIR) process 1700, according to an embodiment of the present invention. Process 1700 may be executed by a NFIR system on the vehicle. Process 1700 begins with capturing an image of target, or a nozzle of the target, at 1702. At 1704 contrast stretching and noise reduction is performed on the captured image. At 1706, the NFIR system determines whether the captured image has been tracked. For example, the NFIR system propagates the arc from point A to point B to assess whether the features it has rendered compare favorably to those loaded into the NFIR system's pre-flight target model.

If the image has not been tracked, then the NFIR system enters the acquisition phase. In the acquisition phase, the NFIR system automatically acquires the location of the target at 1708. If the NFIR system determines at 1710 that the location of the target has not been automatically acquired, then NFIR system manually acquires the location of the target at 1712.

In order for the NFIR system to determine an accurate location of the nozzle, visual cameras, or other cameras, may be used to automatically capture at 1714 an initial 6 degrees of freedom (DOF) pose estimate to help the NFIR system acquire the target. At 1716, feature location of the target, such as the location of the nozzle, is predicted. At 1718, the NFIR system enters the tracking module to assess whether the image has been tracked and performs edge detection on the captured image of the target. At 1720, features, such as lines and arcs, of the target are detected based on the predicted feature locations.

As more features are identified and correlated to the model, confidence is built that the 6-DOF pose estimate computed at 1722 is accurate and the object is being tracked. As geometry, range or lighting conditions change, it is likely that the number of tracked features will also change, possibly requiring the system to revert from the tracking mode back to acquisition mode. For example, image processing may be performed at 1724 through 1732 to make corrections to improve the features seen in 1728.

In this embodiment, at 1724, the image of the target is filtered using a Kalman filtering technique to generate 6 DOF estimation at 1726. At 1728, the NFIR system determines whether the features in the field of view are sufficient. If the features are not sufficient, then at 1730, the field of view is adjusted; otherwise, at 1732 the next image of the target is captured. This process may continue throughout the operations of the NFIR system.

Stated differently, process 1700 allows the vehicle to continuously compare the captured image of the target with a preloaded 3D model of the target until the captured image is fully aligned with the 3D model. Such a system allows the vehicle to accurately track the target.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for debris remediation, comprising:
   a spacecraft control unit comprising at least one processor configured to guide and navigate the apparatus to a target;
   a dynamic object characterization unit configured to match a rate of the apparatus with a rate of the target to characterize movement of the target for debris remediation; and
   a capture and release unit configured to enter through an engine nozzle of the target to remove the target from a congested orbit to an uncongested orbit or to Earth for disposal without creating additional debris.

2. The apparatus of claim 1, wherein the capture and release unit comprises:
   a mast, a plurality of throat sensors, and a plurality of tip sensors.

3. The apparatus of claim 2, wherein the mast is configured to extend into the engine nozzle of the target.

4. The apparatus of claim 2, wherein the mast is further configured to retract after capturing the target.

5. The apparatus of claim 2, wherein the mast comprises a snare configured to inflate within the engine nozzle of the target to facilitate capture of the target.

6. The apparatus of claim 2, wherein the mast comprises a plurality of rollers configured to guide the mast within the engine nozzle of the target.

7. The apparatus of claim 2, wherein the plurality of throat sensors are configured to detect whether the mast has entered the engine nozzle of the target.

8. The apparatus of claim 2, wherein the plurality of tip sensors are configured to detect whether the mast is in physical contact with the engine nozzle of the target.

9. The apparatus of claim 1, wherein the capture and release unit further comprises a plurality of airbags configured to inflate within the engine nozzle of the target to align the apparatus with the target.

10. The apparatus of claim 1, further comprising a cowcatcher configured to protect the capture and release unit and react launch loads of the apparatus.

11. The apparatus of claim 1, further comprising a plurality of rollers configured to guide the apparatus within the engine nozzle of the target.

12. The apparatus of claim 1, further comprising:
    a plurality of pressurized helium tanks containing pressurized helium.

13. The apparatus of claim 12, wherein at least one of the plurality of pressurized helium tanks is configured to release the pressurized helium into a mast to cause the mast to extend into the engine nozzle of the target.

14. The apparatus of claim 1, further comprising:
    a power unit configured to power the apparatus prior to, during, and after, capture of the target.

15. The apparatus of claim 14, wherein the power unit comprises a solar array configured to provide energy to the apparatus.

16. The apparatus of claim 15, wherein the solar array is further configured to expand when collecting energy.

17. The apparatus of claim 15, wherein the solar array is further configured to retract when the apparatus performs a rendezvous and capture sequence on the target.

18. The apparatus of claim 14, wherein the power unit further comprises at least one battery configured to provide energy to the apparatus.

19. The apparatus of claim 1, further comprising:
    a propulsion unit configured to drive and rotate the apparatus.

20. The apparatus of claim 19, wherein the propulsion unit comprises a main engine configured to drive the apparatus in a forward direction.

21. The apparatus of claim 19, wherein the propulsion unit further comprises a plurality of thrusters to rotate the apparatus.

22. The apparatus of claim 1, wherein the spacecraft control unit is further configured to perform an autonomous approach to a target and control the target when the target is captured.

23. The apparatus of claim 1, wherein the dynamic object characterization unit is further configured to analyze physical and motion characteristics of the target to enable the spacecraft control unit to produce an approach and capture solution.

24. The apparatus of claim 23, wherein the physical and motion characteristics of the target are analyzed based on data received from a plurality of sensors.

25. The apparatus of claim 1, further comprising:
    a plurality of noise radars configured to provide data with respect to a motion of the target.

26. The apparatus of claim 1, further comprising:
    an infrared camera configured to provide bearing data when rendezvousing with the target.

27. The apparatus of claim 1, further comprising:
    an infrared camera configured to capture media of a target, and provide the media to a ground control unit when rendezvousing with the target, wherein
    the media comprises video data, image data, or both.

28. A method for debris remediation, comprising:
    performing, by an apparatus comprising at least one processor, a rendezvous procedure with a target;

analyzing, by the apparatus comprising the at least one processor, the target prior to capturing the target;

capturing, by the apparatus, the target through an engine nozzle of the target after a rotation rate of the apparatus is matched with a rotation rate of the target; and removing, by the apparatus, the captured target from a congested orbit to an uncongested orbit or to Earth for disposal without creating additional debris.

29. The method of claim 28, further comprising:
separating from a launch vehicle at lower earth orbit.

30. The method of claim 28, further comprising:
loitering in lower earth orbit until the target is near the apparatus.

31. The method of claim 28, wherein the rendezvous procedure is performed when orbital planes of the target and apparatus match.

32. The method of claim 28, further comprising:
calculating an approach to the target based on the analysis of the target.

33. The method of claim 28, wherein the capturing of the target comprises performing a translation and rotation thrust to place the apparatus in proper orientation on a radial pattern with an X-axis of the apparatus positioned near the engine nozzle of the target.

34. The method of claim 28, wherein the capturing of the target comprises adjusting and stabilizing the apparatus to position the apparatus in a proper relative position and attitude on a radial pattern with an X-axis position on a centerline of the engine nozzle.

35. The method of claim 28, wherein the capturing of the target comprises matching a plane of the apparatus with a plane of the target.

36. The method of claim 28, wherein the capturing of the target comprises connecting with the target, such that the apparatus and target are structurally connected.

* * * * *

UNITED STATES PATENT AND TRADEMARK OFFICE
CERTIFICATE OF CORRECTION

PATENT NO.       : 9,187,189 B2                          Page 1 of 1
APPLICATION NO.  : 13/650738
DATED            : November 17, 2015
INVENTOR(S)      : Anthony D. Griffith, Sr. et al.

It is certified that error appears in the above-identified patent and that said Letters Patent is hereby corrected as shown below:

Title Page, (item 73, Assignees) at lines 2-4, change "National Aeronautics and Space Administration, Houston, TX" to --The United States of America as represented by the Administrator of the National Aeronautics and Space Administration, Washington, DC--.

Signed and Sealed this
Twenty-first Day of June, 2016

Michelle K. Lee
*Director of the United States Patent and Trademark Office*